US 11,791,640 B2

(12) United States Patent
Kozuma et al.

(10) Patent No.: US 11,791,640 B2
(45) Date of Patent: Oct. 17, 2023

(54) OVERDISCHARGE PREVENTION CIRCUIT OF SECONDARY BATTERY AND SECONDARY BATTERY MODULE

(71) Applicant: Semiconductor Energy Laboratory Co., Ltd., Atsugi (JP)

(72) Inventors: Munehiro Kozuma, Atsugi (JP); Takayuki Ikeda, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 285 days.

(21) Appl. No.: 17/298,698

(22) PCT Filed: Dec. 5, 2019

(86) PCT No.: PCT/IB2019/060459
§ 371 (c)(1),
(2) Date: Jun. 1, 2021

(87) PCT Pub. No.: WO2020/128702
PCT Pub. Date: Jun. 25, 2020

(65) Prior Publication Data
US 2022/0052541 A1 Feb. 17, 2022

(30) Foreign Application Priority Data

Dec. 19, 2018 (JP) .................... 2018-237087
Dec. 21, 2018 (JP) .................... 2018-240100

(51) Int. Cl.
*H02J 7/00* (2006.01)
*H01M 10/44* (2006.01)
*H01M 10/48* (2006.01)

(52) U.S. Cl.
CPC ......... *H02J 7/00306* (2020.01); *H01M 10/44* (2013.01); *H01M 10/48* (2013.01);
(Continued)

(58) Field of Classification Search
CPC .... H02J 7/00306; H02J 7/0031; H02J 7/0047; H01M 10/44; H01M 10/48; H01M 2220/20
(Continued)

(56) References Cited

U.S. PATENT DOCUMENTS

2013/0257354 A1 10/2013 Koyama
2013/0265010 A1 10/2013 Nomura et al.
(Continued)

FOREIGN PATENT DOCUMENTS

CN 103730699 A 4/2014
CN 109891700 A 6/2019
(Continued)

OTHER PUBLICATIONS

International Search Report (Application No. PCT/IB2019/060459) dated Mar. 3, 2020.
(Continued)

*Primary Examiner* — Nathaniel R Pelton
(74) *Attorney, Agent, or Firm* — ROBINSON INTELLECTUAL PROPERTY LAW OFFICE; Eric J. Robinson

(57) ABSTRACT

Rapid degradation an off-leakage current in an overdischarged state is prevented. In order to prevent an overdischarged state, a control circuit with low leakage current includes a transistor using an oxide semiconductor, whereby the characteristics of the secondary battery are retained. In addition, a system in which a control signal generation circuit is also integrated is formed. With this system structure, the control circuit enters a low-power consumption mode in accordance with the circuit operation after an overdischarge is detected. When recovering from an over-
(Continued)

discharged state, the control circuit enters a normally-operating mode in accordance with the voltage increase when charging is started.

7 Claims, 13 Drawing Sheets

(52) U.S. Cl.
CPC .......... *H02J 7/0031* (2013.01); *H02J 7/0047* (2013.01); *H01M 2220/20* (2013.01)

(58) Field of Classification Search
USPC .......................................................... 320/134
See application file for complete search history.

(56) References Cited

U.S. PATENT DOCUMENTS

| | | | |
|---|---|---|---|
| 2014/0021904 A1 | 1/2014 | Takahashi et al. | |
| 2014/0103876 A1* | 4/2014 | Kim .................... | H02J 7/0024 |
| | | | 320/112 |
| 2014/0184165 A1 | 7/2014 | Takahashi et al. | |
| 2016/0043070 A1 | 2/2016 | Momo et al. | |
| 2016/0043715 A1 | 2/2016 | Kurokawa et al. | |
| 2016/0043716 A1 | 2/2016 | Kurokawa et al. | |
| 2016/0351975 A1 | 12/2016 | Momo et al. | |
| 2017/0063112 A1 | 3/2017 | Takahashi | |
| 2017/0222208 A1 | 8/2017 | Yamazaki | |
| 2019/0245359 A1* | 8/2019 | Takeuchi ............... | H02H 9/005 |
| 2020/0076223 A1 | 3/2020 | Kuriki et al. | |
| 2020/0278398 A1 | 9/2020 | Isa et al. | |
| 2020/0295413 A1 | 9/2020 | Yamazaki et al. | |
| 2021/0116511 A1 | 4/2021 | Tajima et al. | |
| 2021/0126473 A1 | 4/2021 | Ikeda et al. | |
| 2021/0188068 A1 | 6/2021 | Yoshizumi et al. | |
| 2021/0190471 A1 | 6/2021 | Ikeda et al. | |
| 2021/0242690 A1 | 8/2021 | Okamoto et al. | |
| 2021/0249703 A1 | 8/2021 | Ikeda et al. | |

FOREIGN PATENT DOCUMENTS

| | | |
|---|---|---|
| EP | 3534483 A | 9/2019 |
| KR | 2014-0048737 A | 4/2014 |
| WO | WO-2018/079276 | 5/2018 |

OTHER PUBLICATIONS

Written Opinion (Application No. PCT/IB2019/060459) dated Mar. 3, 2020.

* cited by examiner

410

420

430

440

450

460

470 at the time of charging

OVERDISCHARGE PREVENTION CIRCUIT OF SECONDARY BATTERY AND SECONDARY BATTERY MODULE

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. In particular, one embodiment of the present invention relates to an electronic device including a charging control system, a charging control method, and a secondary battery. One embodiment of the present invention relates to a vehicle or an electronic device for vehicles provided in a vehicle.

Note that in this specification, a power storage device refers to every element and device having a function of storing power. Examples of the power storage device include a storage battery (also referred to as a secondary battery) such as a lithium-ion secondary battery, a lithium-ion capacitor, an all-solid-state battery, and an electric double layer capacitor.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and notebook computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

In one of the caution statements of an electric vehicle (EV) by its manufacturer, it is recommended that in the case where the EV is not used for a long period of time, the EV be charged at least once every three months. Furthermore, it is stated therein that when the EV is left with no remaining battery amount for two weeks, the battery might be degraded. The factor thereof would be an overdischarged state.

Portable secondary batteries (also referred to as mobile batteries) for charging a smartphone, a tablet, or the like have become increasingly popular in the case where the smartphone, the tablet, or the like is about to run out of battery outdoors. The design of portable devices is increasingly becoming a battery-integrated design in which a battery cannot be removed and replaced; hence, demand for mobile batteries is arising.

In a smartphone, a tablet, a laptop computer, and the like, a small secondary battery for retaining information of a date and the time is included aside from a main secondary battery.

In a secondary battery of a portable information terminal and the like, the secondary battery is monitored and controlled by a protection circuit to maintain a state where a voltage can be supplied normally. Patent Document 1 discloses a transistor in which an oxide semiconductor is used for controlling the protection circuit.

REFERENCE

Patent Document

Patent Document 1

United States Patent Publication No. 2013/0265010

SUMMARY OF THE INVENTION

Problems to be Solved by the Invention

When a secondary battery of an electric vehicle, a portable information terminal, or the like is used, the capacity of the secondary battery is consequently reduced, whereby the capacity reaches the lower voltage limit set in the protection circuit and the like. When the capacity of the secondary battery reaches the lower voltage limit, the secondary battery is regarded to be in an overdischarged state, whereby a power shutdown switch in a portion connecting the secondary battery and the portable information terminal (not including the secondary battery) is turned off.

Even when a current path is turned off by the power shutdown switch (a transistor or the like), an off-leakage current is generated since the switch does not have a complete insulating property. In particular, in the case where the amount of an off-leakage current is high in an overdischarged state, the voltage of the battery continues to decrease. If this state is continued, the voltage of the battery becomes lower than the lower voltage limit and the battery rapidly degrades, whereby the battery might lose its function as a secondary battery.

When a portable information terminal with low remaining battery amount is left for a long period of time, the voltage of the battery thereof becomes lower than the lower voltage limit due to the same reason, whereby a charging period until the voltage of the battery reaches the lower voltage limit and a charging time until the battery is charged to a state where the voltage of the battery is higher than the lower voltage limit and the battery has remaining amount are needed; therefore a long charging time is estimated until the battery can be used again because the charging period and the charging time are combined.

In the case where a small secondary battery for retaining information of a date and the time has no remaining battery amount and is left for a long period of time, the retained data of a date and the time is lost; therefore, a date and the time have to be set again after the battery is charged.

A battery that has once entered an overdischarged state becomes a battery that is likely to enter an overdischarged state when used again after being charged, and degrades greatly in some cases.

Means for Solving the Problems

In order to prevent an overdischarged state, a control circuit with low leakage current includes a transistor using an oxide semiconductor, whereby the characteristics of the secondary battery are retained. In addition, a system in which a control signal generation circuit is also integrated is formed. With this system structure, the control circuit enters a low-power consumption mode in accordance with the circuit operation after an overdischarge is detected. When recovering from an overdischarged state, the control circuit enters a normally-operating mode in accordance with the voltage increase when charging is started.

The structure of the invention disclosed in this specification is an overdischarge prevention circuit of a secondary battery that includes, a charging control circuit electrically connected to a secondary battery, a disconnecting transistor between the secondary battery and the charging control circuit, a first transistor whose source is electrically connected to a wiring connecting the secondary battery and the disconnecting transistor, a second transistor connected to a wiring connecting the disconnecting transistor and the charging control circuit, and a third transistor whose drain or source is connected to a gate of the second transistor.

In the above structure, the overdischarge prevention circuit may further include an inverter, an input of the inverter may be connected to a drain of the second transistor, and an output of the inverter may be connected to a gate of the first transistor. Note that charging detection can be performed using the second transistor, the third transistor, and the inverter.

In the above structure, a charging detection circuit included in the overdischarge prevention circuit can disconnect the electrical connection between the first transistor and the second transistor by driving the disconnecting transistor.

In the above structure, at least a semiconductor layer of the first transistor is an oxide semiconductor layer. With the use of an oxide semiconductor layer, the leakage current of the first transistor can be extremely low. That is, with the use of the first transistor, written data can be retained for a long period of time, and thus the frequency of the refresh operation for the memory cell can be decreased. In addition, refresh operation for the memory cell can be omitted. Owing to an extremely low leakage current, the memory cell can retain analog data.

The overdischarge prevention circuit can be referred to as a circuit that prevents the degradation of the charging performance of a secondary battery due to overdischarging.

A combination of the overdischarge prevention circuit mentioned above and a secondary battery is referred to as a secondary battery module and the structure thereof is also one of the present inventions. The structure is a secondary battery module that includes, a secondary battery, the charging control circuit electrically connected to the secondary battery, the disconnecting transistor between the secondary battery and the charging control circuit, the first transistor whose source is electrically connected to the wiring connecting the secondary battery and the disconnecting transistor, the second transistor connected to the wiring connecting the disconnecting transistor and the charging control circuit, and the third transistor whose drain or source is connected to the gate of the second transistor.

In the above structure, the overdischarge prevention circuit may further include an inverter, an input of the inverter may be connected to the drain of the second transistor, and an output of the inverter may be connected to the gate of the first transistor. Note that charging detection can be performed using the second transistor, the third transistor, and the inverter.

In the above structure, the charging detection circuit included in the overdischarge prevention circuit can disconnect the electrical connection between the first transistor and the second transistor by driving the disconnecting transistor.

The battery module is referred to as a battery pack in some cases. One battery pack may be formed by providing the overdischarge prevention circuit to each of a plurality of secondary batteries and combining the secondary batteries. Alternatively, one battery pack may be formed by providing one overdischarge prevention circuit to a plurality of secondary batteries.

The secondary battery is not limited to a lithium-ion secondary battery, and the present invention can be effectively used for a nickel-metal hydride secondary battery, a sodium-ion secondary battery, a zinc-air battery, an all-solid-state secondary battery, and the like.

Effect of the Invention

A signal generation circuit for control with low power consumption can be integrated with the control circuit including a transistor using an oxide semiconductor; therefore, the off-leakage current in the entire system after the detection of an overdischarge can be reduced. Furthermore, by reducing the amount of off-state leakage current in the entire system, a power storage state can be maintained for a long period of time, whereby a battery system capable of restarting the charging normally can be achieved.

MODE FOR CARRYING OUT THE INVENTION

Embodiments of the present invention are described in detail with reference to the drawings. Note that the present invention is not limited to the following description, and it is readily understood by those skilled in the art that modes and details of the present invention can be modified in various ways. In addition, the present invention should not be construed as being limited to the description of embodiments below.

Embodiment 1

Figure 1:
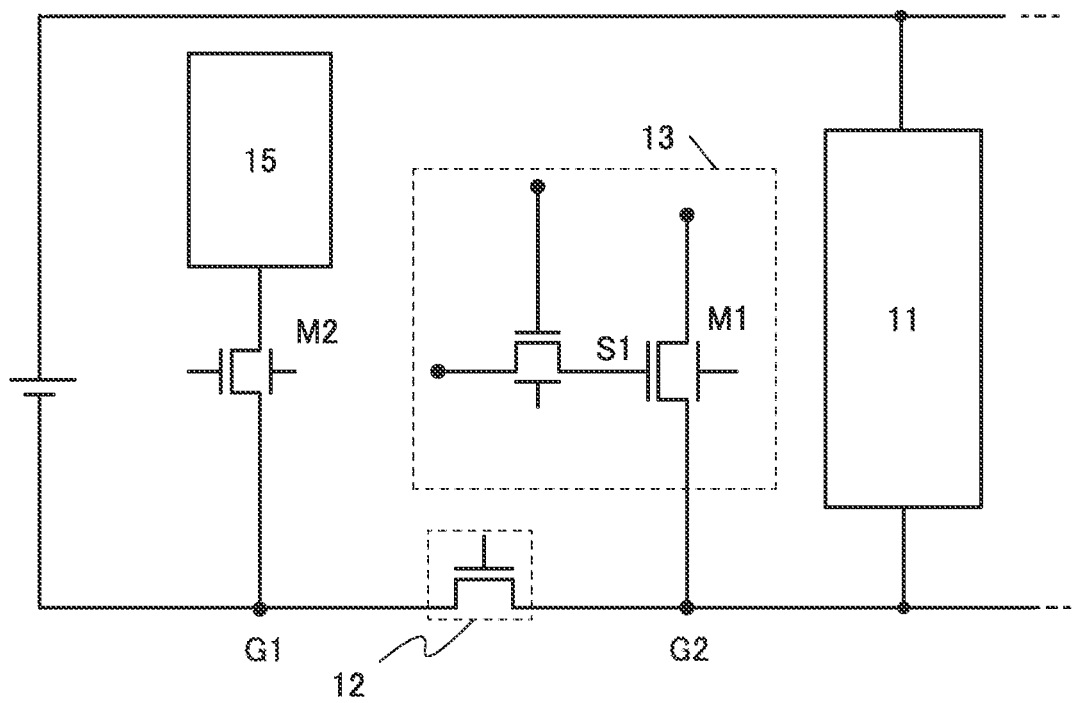
FIG. 1 is an example of a circuit diagram of one embodiment of the present invention.

FIG. 1 shows a circuit diagram for describing an example of an operation for a measure against off-state leakage current.

The low potential side of a circuit 15 connected to a secondary battery is connected to G1 on the low potential side like a transistor M2. Note that an example where the transistor in FIG. 1 is a transistor including a back gate is shown; however, the structure thereof is not particularly limited thereto and a transistor not including a back gate may be used.

The charging detection circuit is connected to G2 on the low potential side. A disconnecting switch 12 is provided between G1 on the low potential side and G2 on the low potential side. In this embodiment, the charging detection circuit 13 and the circuit 15 are connected to different power sources. When the circuit 15 is completely stopped by the power supply being blocked by the disconnecting switch 12, the increase in voltage cannot be recognized when charging is performed again; therefore, the charging detection circuit 13 and the circuit 15 are connected to different power sources and this feature point is novel.

When the secondary battery enters an overdischarged state by the decrease in the supply voltage of the secondary battery due to the power consumption caused by the use of the secondary battery, G1 and G2 are disconnected by the disconnecting switch 12 through an overdischarge detection operation of the circuit 15. Simultaneously, the transistor M2 is turned off by the decrease in the gate potential of the transistor M2. The circuit 15 includes an overdischarge detection circuit.

Since the transistor M2 functions as a power switch that controls the power supply for G1 on the low potential side of the secondary battery, the power supply to all of the circuits except the charging detection circuit is blocked when the transistor M2 is turned off. Meanwhile, the potential of G2 increases to a potential that is the same as that of the secondary battery on the high potential side (VDD) at a maximum. Since the potential of a gate S1 of the transistor M1 decreases relative to that of G2 (Vgs of the transistor M1 decreases), the transistor M1 is turned off. The transistor M1 functions as a power switch that controls the power supply for G2 on the low potential side of a charging control circuit 11; therefore, the power supply to the charging detection circuit is blocked when the transistor M1 is turned off. At this time, the circuit 15 is in a state where an off-leakage current is reduced (low-power consumption mode).

When the charging of the secondary battery is started, a low potential of the charging control circuit 11 is supplied and the potential of G2 is decreased again (Vgs of the transistor M1 is increased), whereby the transistor M1 is turned on. Then, when the charging detection circuit detects a charging state of the secondary battery, the gate potential of the transistor M2 is increased and the circuit 15 other than the charging detection circuit is turned on (normally-operating mode).

As described above, by adopting a structure in which the system is turned off in accordance with its operation state using an OS transistor (a transistor using an oxide semiconductor which is a kind of metal oxide as the semiconductor layer in which a channel is formed) in the circuit 15, that is, the system is automatically turned off, an off-leakage current in the entire system in an overdischarged state can be reduced. In this structure, the system can not only automatically turn off but can also automatically recover from an off-state, that is, the system can automatically turn on.

The OS transistor using an oxide semiconductor containing indium, gallium, and zinc has a characteristic of an extremely low off-state current. When the OS transistor is used as the transistor M1, the leakage current of the transistor M1 can be extremely low. That is, with the use of the transistor M1, written data can be retained for a long period of time, and thus the frequency of the refresh operation for the memory cell can be decreased. In addition, refresh operation for the memory cell can be omitted. Owing to an extremely low leakage current, the memory cell can retain analog data. An OS transistor can achieve an off-state current lower than that of a SiFET by 15 digits.

The circuit 15 is a charging control circuit including a memory circuit including a transistor using an oxide semiconductor and this charging control circuit or battery control system is referred to as BTOS (Battery operating system or Battery oxide semiconductor) in some cases.

Embodiment 2

In this embodiment, a specific example of a circuit structure is described with reference to FIG. 2. It is to be noted that portions that are the same as those in FIG. 1 are denoted by the same reference numerals.

Figure 2:
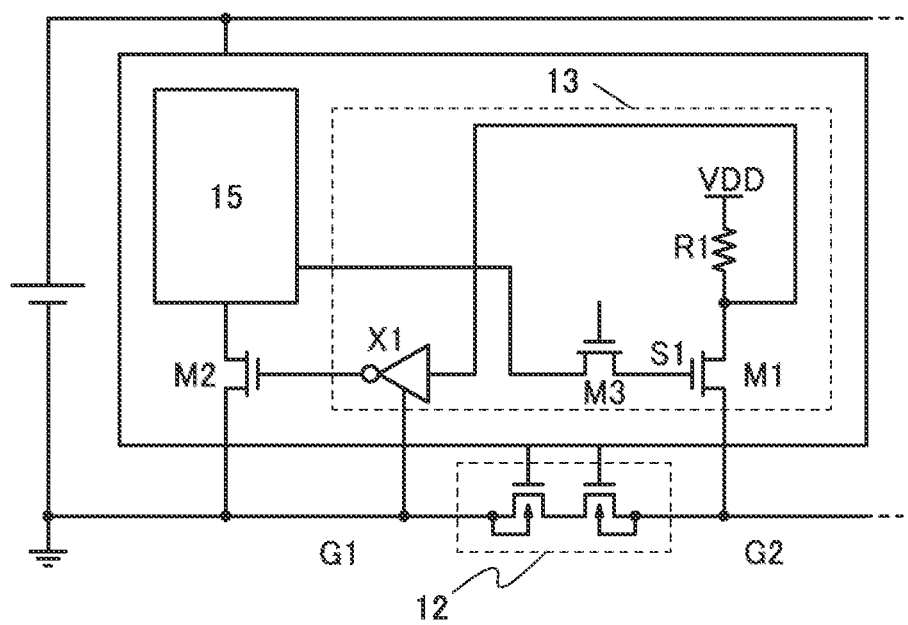
FIG. 2 is an example of a circuit diagram of one embodiment of the present invention.

In FIG. 2, the charging detection circuit 13 includes the transistor M1, a transistor M3, a pull-up resistor R1, and an inverter X1. A low power supply potential (VSS) of a battery is supplied to the power source on the low potential side of the circuit 15 through the transistor M2 which can be regarded as a power switch.

The circuit 15 indicates one or a plurality of a comparator, a delay detection logic circuit, an oscillator circuit, a circuit for a residual capacity meter, a micro short-circuit prediction circuit, and the like.

The transistor M3 has an extremely low off-leakage current characteristics used to achieve the potential retention of S1. An example where each of the transistors in FIG. 2 does not include a back gate is shown; however, the structure thereof is not particularly limited thereto and the transistor may include a back gate.

When the system is turned on, S1 is High (VDD); therefore, the input potential of the inverter X1 becomes Low, and the gate potential of the transistor M2 (the output potential of the inverter X1) becomes High. In other words, since the transistor is turned on, the circuit 15 enters a state where VSS is supplied.

On the other hand, when the system is turned off, S1 is Low (VSS); therefore, the input potential of the inverter X1 becomes High, and the gate potential of the transistor M2 (the output potential of the inverter X1) becomes Low. In other words, since the transistor M2 is in an off state, the circuit 15 enters a state where VSS is not supplied (power gating state). Thus, by using a switch with extremely low off-leakage current characteristics (for example, an OS transistor) for the transistor M2, the off-leakage current of the circuit 15 can be reduced. In particular, an oxide semiconductor formed of indium, gallium, and zinc is preferably used for the semiconductor layer of the OS transistor.

When the battery is in an overdischarged state where an off-leakage current is especially needed to be reduced, the voltage Vgs of the transistor M1 which is the potential difference between S1–G2 gets closer to 0 V since the potential of G2 increases to VDD, whereby the transistor M1 is turned off. At this time, the input potential of the inverter X1 becomes High by the pull-up resistor R1, and the gate potential of the transistor M2 (the output potential of the inverter X1) becomes Low. In other words, since the transistor M2 is in an off state, the circuit 15 enters a state where a voltage VSS is not supplied (power gating state). Thus, by using a switch with extremely low off-leakage current characteristics (for example, an OS transistor) for the transistor M2, the off-leakage current of the circuit 15 can be reduced. Then, when the charging is started, the potential of G2 is returned to VSS and the system returns to a circuit state equivalent to that when the system is in an on state, whereby the power supply to the circuit 15 is started.

A gate control signal of the transistor M3 aims to retain a node of S1. A potential for S1 is supplied from the circuit 15; however, when the circuit 15 is in an off state, the supply source of the output signal does not exist, whereby the potential becomes an undefined value. When S1 functions as a memory, charging detection can function normally even when the circuit 15 is in an off state.

The current supply capability of the transistor M1 and the pull-up resistor R1 determines the input potential of the inverter X1; therefore, compared to the pull-up resistor R1, the transistor M1 needs to have a sufficiently high on-state current and a sufficiently low off-state current. The pull-up resistor R1 may include a pull-up transistor using a transistor. When the pull-up resistor is achieved with the same connection structure as the transistors M1 and M3, the amount of pull-up current can be adjusted depending on a value of a writing potential.

An overdischarge detection comparator can be used in the charging detection circuit. In that case, the output logic of the comparator is set so that the ON/OFF control of the transistor M2 can be performed.

This embodiment can be freely combined with Embodiment 1.

Embodiment 3

In this embodiment, circuit structure examples of a memory means are illustrated in FIG. 3A to FIG. 3G. FIG. 3A to FIG. 3G each function as a memory element. A memory element 410 shown in FIG. 3A includes the transistor M1 and a capacitor CA. The memory element 410 is a memory element including one transistor and one capacitor.

A first terminal of the transistor M1 is connected to a first terminal of the capacitor CA. A second terminal of the transistor M1 is connected to a wiring BL. A gate of the transistor M1 is connected to a wiring WL. A back gate of the transistor M1 is connected to a wiring BGL. A second terminal of the capacitor CA is connected to a wiring CAL. A node to which the first terminal of the transistor M1 and the first terminal of the capacitor CA are electrically connected is referred to as a node ND.

In an actual transistor, a gate and a back gate are provided to overlap with each other with a channel formation region of a semiconductor layer therebetween. The gate and the back gate can each function as a gate. Thus, when one of them is referred to as a "back gate", the other is referred to as a "gate" or a "front gate" in some cases. In some other cases, one of them is referred to as a "first gate" and the other is referred to as a "second gate".

The potential of the back gate may be the same as the potential of the gate, or may be a ground potential or a given potential. By changing the potential of the back gate independently of that of the gate, the threshold voltage of the transistor can be changed.

Providing the back gate and setting the potentials of the gate and the back gate electrode to be the same, a region of the semiconductor layer through which carriers flow is enlarged in the film thickness direction; thus, the amount of carrier transfer is increased. As a result, the on-state current of the transistor is increased and the field-effect mobility is increased.

Thus, the transistor can be a transistor having high on-state current for its occupation area. That is, the occupation area of the transistor can be small for required on-state current. Accordingly, a semiconductor device having a high degree of integration can be provided.

The wiring BGL functions as a wiring for applying a potential to the back gate of the transistor M1. By applying a given potential to the wiring BGL, the threshold voltage of the transistor M1 can be increased or decreased.

Data write and read are performed in such a manner that a high-level potential is applied to the wiring WL to turn on the transistor M1 so that the wiring BL is electrically connected to the node ND.

The wiring CAL functions as a wiring for applying a predetermined potential to the second terminal of the capacitor CA. A fixed potential is preferably applied to the wiring CAL.

Figure 3A:
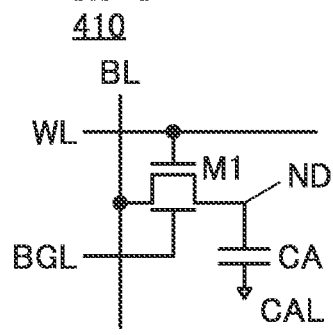
FIG. 3A, FIG. 3B, FIG. 3C, FIG. 3D, FIG. 3E, FIG. 3F, and FIG. 3G illustrate examples of memory circuit structures.
Figure 3B:
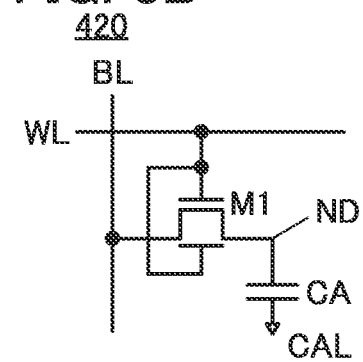

A memory element 420 shown in FIG. 3B is a modification example of the memory element 410. In the memory element 420, the back gate of the transistor M1 is electrically connected to the wiring WL. With such a structure, a potential which is the same as that of the gate of the transistor M1 can be applied to the back gate of the transistor M1. Thus, the amount of current flowing through the transistor M1 can be increased when the transistor M1 is on.

Figure 3C:
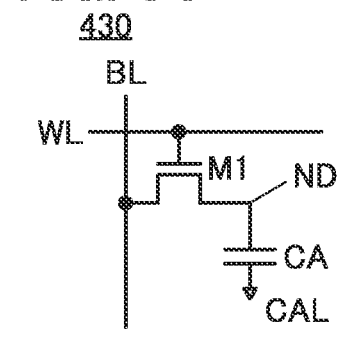

As in the memory element 430 shown in FIG. 3C, the transistor M1 may be a single-gate transistor (a transistor without a back gate). The memory element 430 has a structure of the memory element 410 and the memory element 420 from which the back gate of the transistor M1 is eliminated. Thus, the number of fabrication steps of the memory element 430 can be smaller than those of the memory element 410 and the memory element 420.

The memory element 410, the memory element 420, and the memory element 430 are each a DRAM-type memory element.

An oxide semiconductor is preferably used for a semiconductor layer in which a channel of the transistor M1 is formed. In this specification and the like, a transistor including an oxide semiconductor in a semiconductor layer in which a channel is formed is also referred to as an "OS transistor".

For example, as the oxide semiconductor, an oxide semiconductor containing any one of indium, an element M (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like), and zinc can be used. In particular, the oxide semiconductor is preferably an oxide semiconductor containing indium, gallium, and zinc.

An OS transistor has a characteristic of an extremely low off-state current. When an OS transistor is used as the transistor M1, the leakage current of the transistor M1 can be extremely low. That is, written data can be retained for a long period of time with the transistor M1. Thus, the frequency of refresh of the memory element can be reduced. In addition, refresh operation of the memory element can be omitted. Furthermore, since the leakage current is extremely low, multilevel data or analog data can be retained in the memory element 410, the memory element 420, and the memory element 430.

In this specification and the like, a DRAM using an OS transistor is referred to as a DOSRAM (Dynamic Oxide Semiconductor Random Access Memory).

Figure 3D:
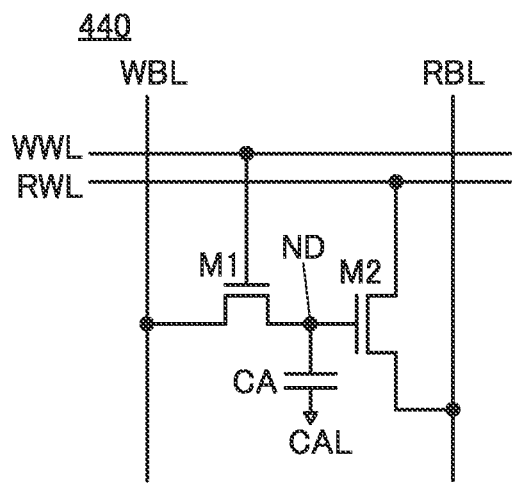

FIG. 3D shows a circuit structure example of a gain-cell memory element including two transistors and one capacitor. A memory element 440 includes the transistor M1, a transistor M2, and the capacitor CA.

A first terminal of the transistor M1 is connected to a first terminal of the capacitor CA. A second terminal of the transistor M1 is connected to a wiring WBL. A gate of the transistor M1 is connected to a wiring WWL. A second terminal of the capacitor CA is connected to a wiring CAL. A first terminal of the transistor M2 is connected to a wiring RBL. A second terminal of the transistor M2 is connected to a wiring RWL. A gate of the transistor M2 is connected to the first terminal of the capacitor CA. A node to which the first terminal of the transistor M1, the first terminal of the capacitor CA, and the gate of the transistor M2 are electrically connected is referred to as a node ND.

The bit line WBL functions as a write bit line, the bit line RBL functions as a read bit line, the word line WWL functions as a write word line, and the word line RWL functions as a read word line. The transistor M1 has a function of a switch for controlling conduction or non-conduction between the node ND and the bit line WBL.

It is preferable to use an OS transistor as the transistor M1. As described above, since the OS transistor has extremely low off-state current, a potential written to the node ND can be retained for a long period of time when the OS transistor is used as the transistor M1. In other words, data written in the memory element can be retained for a long period of time.

A transistor to be used as the transistor M2 is not particularly limited. Any of an OS transistor, a Si transistor (a transistor in which silicon is used for a semiconductor layer), and other transistors may be used as the transistor M2.

Note that in the case where a Si transistor is used as the transistor M2, silicon used for the semiconductor layer may be amorphous silicon, polycrystalline silicon, low-temperature poly-silicon (LTPS), or single crystal silicon. Since a Si transistor has higher field-effect mobility than an OS transistor in some cases, the use of the Si transistor as a read transistor can improve the operation speed at the time of read.

In the case where an OS transistor is used as the transistor M1 and a Si transistor is used as the transistor M2, the two transistors may be provided in different layers to be stacked on one another. An OS transistor can be fabricated with the same manufacturing equipment by the same process as those of a Si transistor. Thus, hybridization of an OS transistor and a Si transistor is easy, and higher integration is also easy.

Furthermore, when an OS transistor is used as the transistor M2, its leakage current when being non-selected can be extremely low; thus, reading accuracy can be improved. When an OS transistor is used for each of the transistor M1 and the transistor M2, the number of fabrication steps of the semiconductor device can be reduced and the productivity can be improved. It is possible to fabricate the semiconductor device at a process temperature of 400° C. or lower, for example.

Figure 3E:
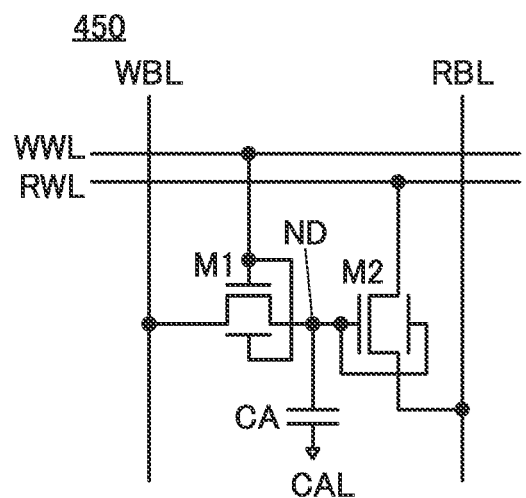
Figure 3F:
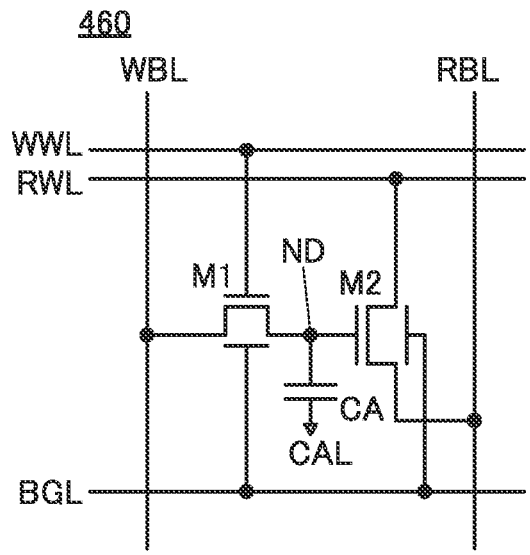
Figure 3G:
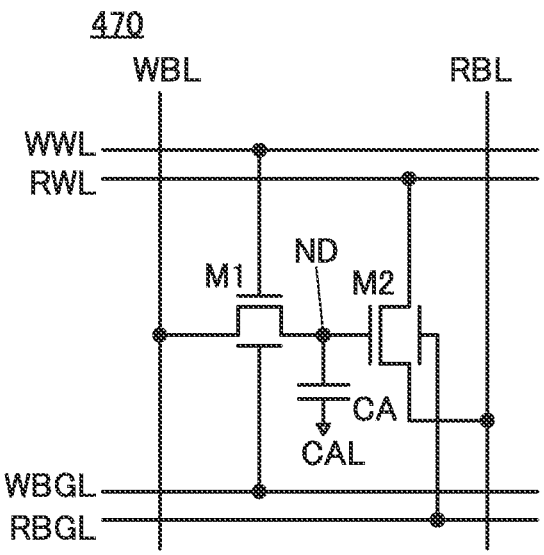

FIG. 3E to FIG. 3G each show a circuit configuration example when a transistor including a back gate (a four-terminal transistor, also referred to as a "four-terminal element") is used for each of the transistor M1 and the transistor M2. A memory element 450 shown in FIG. 3E, a memory element 460 shown in FIG. 3F, and a memory element 470 shown in FIG. 3G are modification examples of the memory element 440.

In the memory element 450 shown in FIG. 3E, the gate and the back gate of the transistor M1 are electrically connected to each other. In addition, the gate and the back gate of the transistor M2 are electrically connected to each other.

In the memory element 460 shown in FIG. 3F, the back gate of the transistor M1 and the back gate of the transistor M2 are electrically connected to the wiring BGL. A predetermined potential can be applied to the back gates of the transistor M1 and the transistor M2 through the wiring BGL.

In the memory element 470 shown in FIG. 3G, the back gate of the transistor M1 is electrically connected to a wiring WBGL, and the back gate of the transistor M2 is electrically connected to a wiring RBGL. When the back gate of the transistor M1 and the back gate of the transistor M2 are connected to different wirings, the threshold voltages can be changed independently of each other.

The memory element 440 to the memory element 470 are each a 2Tr1C-type memory cell. In this specification and the like, a memory device constituting a 2Tr1C-type memory cell using an OS transistor as the transistor M1 is referred to as a NOSRAM (Non-volatile Oxide Semiconductor Random Access Memory). The memory element 440 to the memory element 470 are capable of reading the potential of the node ND by amplifying the potential with the transistor M2. Since the off-state current of an OS transistor is extremely low, the potential of the node ND can be retained for a long time. In addition, non-destructive read is possible, with which the potential of the node ND remains retained even after the read operation.

Data retained in the memory element is data with less rewrite frequency. Thus, it is preferable to use, as the memory element, a NOSRAM, which is capable of non-destructive read and long-term retention of data.

The transistors shown in FIG. 3A, FIG. 3B, and FIG. 3E to FIG. 3G are each a four-terminal element; hence, its input and output can be controlled independently of each other in a simpler manner than that in two-terminal elements typified by MRAM (Magnetoresistive Random Access Memory) utilizing MTJ (Magnetic Tunnel Junction) properties, ReRAM (Resistive Random Access Memory), and phase-change memory.

In addition, the structure of MRAM, ReRAM, and phase-change memory may change at the atomic level when data is rewritten. By contrast, in the memory device of one embodiment of the present invention, data rewrite is performed by charging or discharging of electric charge via transistors; thus, the memory device has characteristics such as high rewrite endurance and less structure changes.

Embodiment 4

In this embodiment is explained a transistor structure which can be used for the structure of the memory element in the above-described embodiment; specifically, a structure in which transistors with different electrical properties are stacked. In this embodiment, structures of transistors included in a memory circuit of a semiconductor device are particularly described. With such a structure, the degree of freedom in design of the semiconductor device can be increased. Stacking transistors with different electrical properties can increase the integration degree of the semiconductor device.

Figure 4:
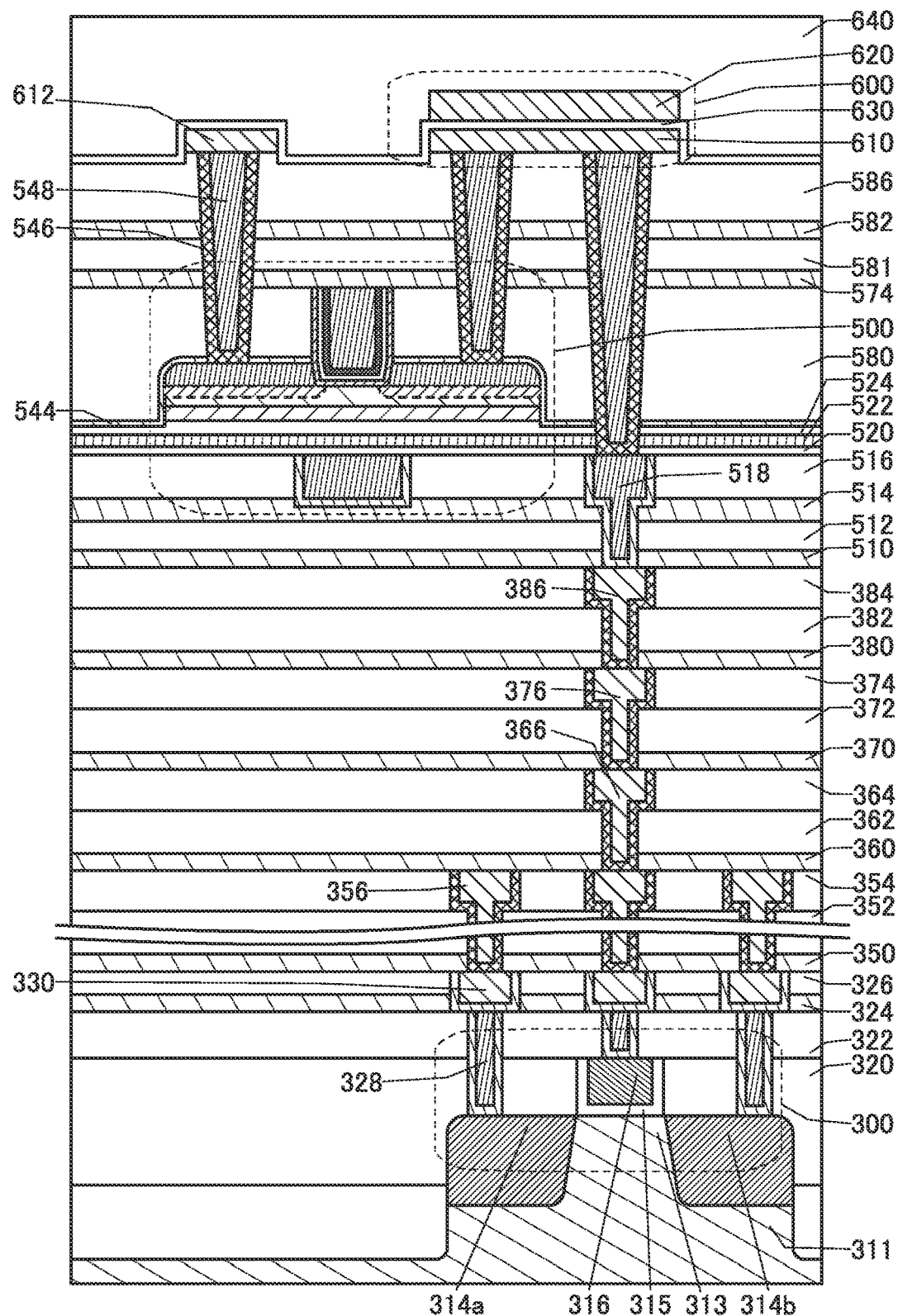
FIG. 4 is a schematic cross-sectional view illustrating a structure example of a semiconductor device.
Figure 6A:
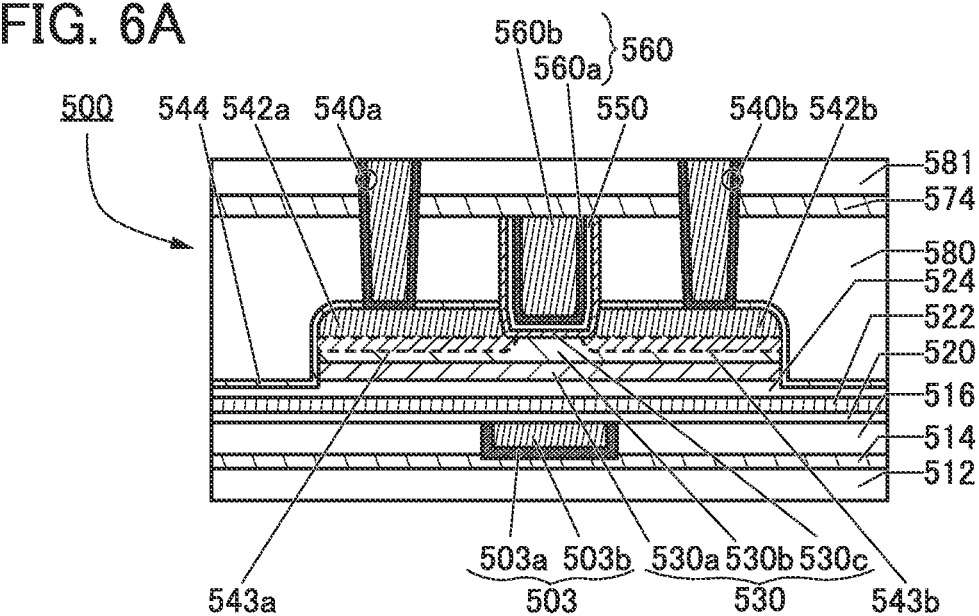
FIG. 6A, FIG. 6B, and FIG. 6C are schematic cross-sectional views illustrating structure examples of transistors.
Figure 6B:
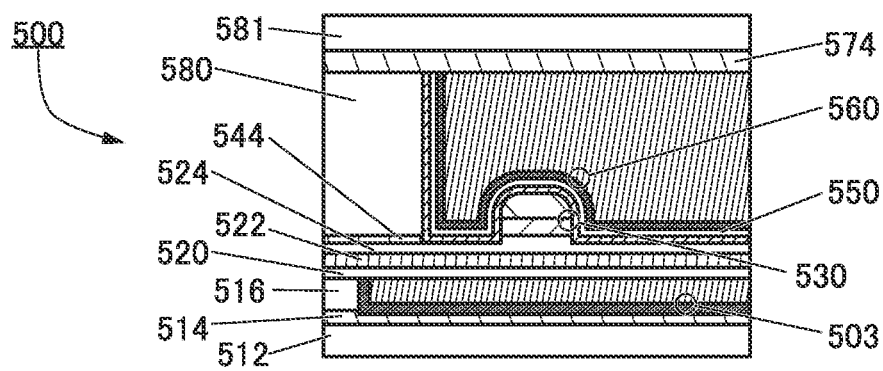
Figure 6C:
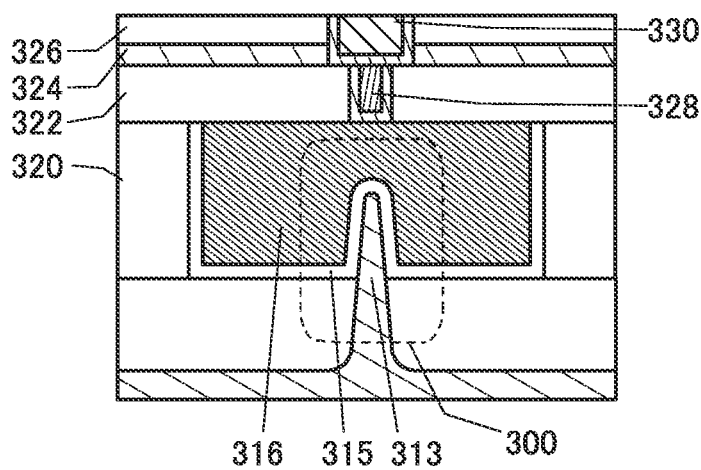

A semiconductor device illustrated in FIG. 4 includes a transistor 300, a transistor 500, and a capacitor 600. FIG. 6A is a cross-sectional view of the transistor 500 in the channel length direction, FIG. 6B is a cross-sectional view of the transistor 500 in the channel width direction, and FIG. 6C is a cross-sectional view of the transistor 300 in the channel width direction.

The transistor 500 is an OS transistor. The transistor 500 has a low off-state current. Therefore, when the structure of the transistor M2 described in the above embodiment is equivalent to that of the transistor 500, for example, a potential can be retained in the node ND for a long period of time. Thus, the frequency of writing of a potential to the node ND is reduced, whereby the power consumption of the semiconductor device can be reduced.

The semiconductor device described in this embodiment includes the transistor 300, the transistor 500, and the capacitor 600, as illustrated in FIG. 4. The transistor 500 is provided above the transistor 300, and the capacitor 600 is provided above the transistor 300 and the transistor 500. For example, the structure of the transistor M1 described in the above embodiment can be equivalent to that of the transistor 300, and the structure of the capacitor CA can be equivalent to that of the capacitor 600.

The transistor 300 is provided over a substrate 311 and includes a conductor 316, an insulator 315, a semiconductor region 313 that is part of the substrate 311, and a low-resistance region 314a and a low-resistance region 314b each functioning as a source region or a drain region.

In the transistor 300, the top surface and the side surface in the channel width direction of the semiconductor region 313 are covered with the conductor 316 with the insulator 315 therebetween, as illustrated in FIG. 6C. In this manner, the effective channel width is increased when the transistor 300 is a Fin type. Thus, the on-state characteristics of the transistor 300 can be improved. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with the use of GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of the conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 5:
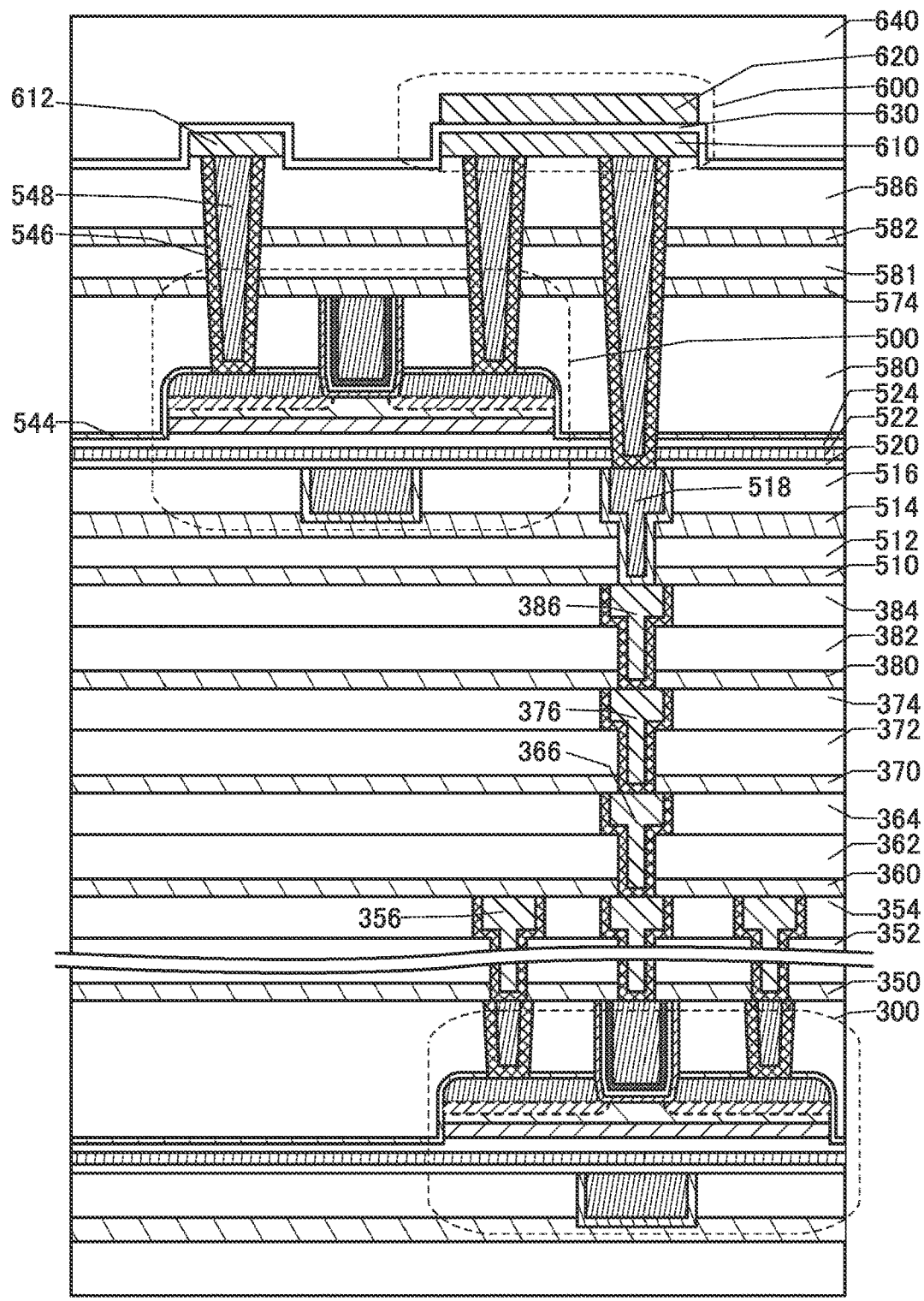
FIG. 5 is a schematic cross-sectional view illustrating a structure example of a semiconductor device.

Note that the transistor 300 illustrated in FIG. 4 is an example and the structure is not limited thereto; an appropriate transistor can be used in accordance with a circuit structure or a driving method. For example, when a semiconductor device is configured as a single-polarity circuit using only OS transistors, the transistor 300 employs a structure similar to that of the transistor 500 that is an OS transistor, as illustrated in FIG. 5. Note that the details of the transistor 500 are described later.

In this specification and the like, a single-polarity circuit refers to a circuit in which all of the transistors have the same polarity, for example. For example, a circuit in which all of the transistors are n-channel transistors can be referred to as a single-polarity circuit.

An insulator 320, an insulator 322, an insulator 324, and an insulator 326 are stacked sequentially and provided to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification and the like, silicon oxynitride refers to a material that contains oxygen at a higher proportion than nitrogen, and silicon nitride oxide refers to a material that contains nitrogen at a higher proportion than oxygen. Furthermore, in this specification and the like, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to increase planarity.

In addition, for the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less that of the insulator 324. When a material with a low relative permittivity is used for an interlayer film, the parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material of each of plugs and wirings (e.g., the conductor 328 and the conductor 330), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is particularly preferable to use tungsten. Alternatively, it is preferable to be formed with a low-resistance conductive material such as aluminum or copper. The use of a low-resistance conductive material can reduce wiring resistance.

A wiring layer may be provided over the insulator 326 and the conductor 330. For example, in FIG. 4, an insulator 350, an insulator 352, and an insulator 354 are stacked in this order. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 or the conductor 330.

Note that for example, as the insulator 350, like the insulator 324, an insulator having a barrier property against hydrogen is preferably used. Furthermore, the conductor 356 preferably contains a conductor having a barrier property against hydrogen. In particular, the conductor having a barrier property against hydrogen is formed in an opening portion provided in the insulator 350 having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is retained. In that case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 4, an insulator 360, an insulator 362, and an insulator 364 are stacked in this order. Furthermore, a conductor 366 is formed in the insulator 360, the insulator 362, and the insulator 364. The conductor 366 has a function of a plug or a wiring. Note that the conductor 366 can be provided using a material similar to those for the conductor 328 or the conductor 330.

Note that for example, as the insulator 360, like the insulator 324, an insulator having a barrier property against hydrogen is preferably used. Furthermore, the conductor 366 preferably contains a conductor having a barrier property against hydrogen. In particular, the conductor having a barrier property against hydrogen is formed in an opening portion provided in the insulator 360 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 364 and the conductor 366. For example, in FIG. 4, an insulator 370, an insulator 372, and an insulator 374 are stacked in this order. Furthermore, a conductor 376 is formed in the insulator 370, the insulator 372, and the insulator 374. The conductor 376 has a function of a plug or a wiring. Note that the conductor 376 can be provided using a material similar to those for the conductor 328 or the conductor 330.

Note that for example, as the insulator 370, like the insulator 324, an insulator having a barrier property against hydrogen is preferably used. Furthermore, the conductor 376 preferably contains a conductor having a barrier property against hydrogen. In particular, the conductor having a barrier property against hydrogen is formed in an opening portion provided in the insulator 370 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 374 and the conductor 376. For example, in FIG. 4, an insulator 380, an insulator 382, and an insulator 384 are stacked in this order. Furthermore, a conductor 386 is formed in the insulator 380, the insulator 382, and the insulator 384. The conductor 386 has a function of a plug or a wiring. Note that the conductor 386 can be provided using a material similar to those for the conductor 328 or the conductor 330.

Note that for example, as the insulator 380, like the insulator 324, an insulator having a barrier property against hydrogen is preferably used. Furthermore, the conductor 386 preferably contains a conductor having a barrier property against hydrogen. In particular, the conductor having a barrier property against hydrogen is formed in an opening portion provided in the insulator 380 having a barrier property against hydrogen. With this structure, the transistor 300 and the transistor 500 can be separated by a barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially and provided over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property that prevents diffusion of hydrogen or impurities from the substrate 311, a region where the transistor 300 is provided, or the like into the region where the transistor 500 is provided. Therefore, a material similar to that for the insulator 324 is preferably used.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors in a change in electrical characteristics of the transistor. Accordingly, aluminum oxide can prevent mixing of impurities such as hydrogen and moisture into the transistor 500 in the fabrication process and after the fabrication of the transistor. In addition, release of oxygen from the metal oxide included in the transistor 500 can be inhibited. Therefore, aluminum oxide is suitably used for a protective film of the transistor 500.

In addition, for the insulator 512 and the insulator 516, a material similar to that for the insulator 320 can be used, for example. Furthermore, when a material with a comparatively low dielectric constant is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (a conductor 503 for example), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 or the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by a layer having a barrier property against oxygen, hydrogen, and water; thus, diffusion of hydrogen from the transistor 300 into the transistor 500 can be inhibited.

The transistor 500 is provided above the insulator 516.

As illustrated in FIG. 6A and FIG. 6B, the transistor 500 includes the conductor 503 positioned to be embedded in the insulator 514 and the insulator 516, an insulator 520 positioned over the insulator 516 and the conductor 503, an insulator 522 positioned over the insulator 520, an insulator 524 positioned over the insulator 522, an oxide 530a positioned over the insulator 524, an oxide 530b positioned over the oxide 530a, a conductor 542a and a conductor 542b positioned apart from each other over the oxide 530b, an insulator 580 that is positioned over the conductor 542a and the conductor 542b and is provided with an opening formed to overlap with a region between the conductor 542a and the conductor 542b, an oxide 530c positioned on a bottom and a side surface of the opening, an insulator 550 positioned on a formation surface of the oxide 530c, and a conductor 560 positioned on a formation surface of the insulator 550.

As illustrated in FIG. 6A and FIG. 6B, an insulator 544 is preferably provided between the insulator 580 and the oxide 530a, the oxide 530b, the conductor 542a, and the conductor 542b. In addition, as illustrated in FIG. 6A and FIG. 6B, the conductor 560 preferably includes a conductor 560a provided inside the insulator 550 and a conductor 560b embedded inside the conductor 560a. As illustrated in FIG. 6A and FIG. 6B, an insulator 574 is preferably provided over the insulator 580, the conductor 560, and the insulator 550.

Note that in the following description, the oxide 530a, the oxide 530b, and the oxide 530c are sometimes collectively referred to as an oxide 530.

Note that although a structure of the transistor 500 in which three layers of the oxide 530a, the oxide 530b, and the oxide 530c are stacked in a region where a channel is formed and its vicinity is shown, the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is shown to have a stacked-layer structure of two layers in the transistor 500, the present invention is not limited thereto. For example, the conductor 560 may have a single-layer structure or a stacked-layer structure of three or more layers. Note that the transistor 500 illustrated in FIG. 4, FIG. 5, FIG. 6A, and FIG. 6B is an example, and the structure is not limited thereto; an appropriate transistor can be used in accordance with a circuit configuration or a driving method.

Here, the conductor 560 functions as a gate electrode of the transistor 500, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to include a region overlapping with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered. In this specification and the like, a transistor structure in which a channel formation region is electrically surrounded by electric fields of a first gate electrode and a second gate electrode is referred to as a surrounded channel (s-channel) structure.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

Here, for the conductor 503a, a conductive material which has a function of inhibiting diffusion of impurities such as a hydrogen atom, a hydrogen molecule, a water molecule, and a copper atom (through which the impurities are less likely to pass) is preferably used. Alternatively, it is preferable to use a conductive material which has a function of inhibiting diffusion of oxygen (e.g., at least one of an oxygen atom, an oxygen molecule, and the like) (through which the oxygen is less likely to pass). Note that in this specification and the like, a function of inhibiting diffusion of impurities or oxygen means a function of inhibiting diffusion of any one or all of the above impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. In that case, the conductor 503a is not necessarily provided. Note that the conductor 503b is a single layer in the diagram but may have a stacked-layer structure, for example, a stack of any of the above conductive materials and titanium or titanium nitrided.

The insulator 520, the insulator 522, and the insulator 524 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0\times10^{18}$ atoms/cm$^3$, preferably greater than or equal to $1.0\times10^{19}$ atoms/cm$^3$, further preferably greater than or equal to $2.0\times10^{19}$ atoms/cm$^3$ or greater than or equal to $3.0\times10^{20}$ atoms/cm$^3$ in TDS (Thermal Desorption Spectroscopy) analysis. Note that the temperature of the film surface in the TDS analysis is preferably in a range of higher than or equal to 100° C. and lower than or equal to 700° C., or higher than or equal to 100° C. and lower than or equal to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of $V_OH$ is cut occurs, i.e., when a reaction of "$V_OH \rightarrow V_O+H$" occurs. Part of hydrogen generated at this time is bonded to oxygen to be $H_2O$, and removed from the oxide 530 or an insulator in the vicinity of the oxide 530 in some cases.

For the microwave treatment, for example, an apparatus including a power supply that generates high-density plasma or an apparatus including a power supply that applies RF to the substrate side is suitably used. Oxygen radicals at a high density can be generated when gas containing oxygen and high-density plasma are used. By applying RF to the substrate side, the oxygen radicals generated by high-density plasma can be introduced into the oxide 530 or the insulator in the vicinity of the oxide 530 efficiently. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ($O_2/(O_2+Ar)$) is lower than or equal to 50%, preferably higher than or equal to 10% and lower than or equal to 30%.

In a fabrication process of the transistor 500, the heat treatment is preferably performed with the surface of the oxide 530 exposed. The heat treatment is performed at higher than or equal to 100° C. and lower than or equal to 450° C., preferably higher than or equal to 350° C. and lower than or equal to 400° C. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). Alternatively, the heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "$V_O+O\rightarrow$null". Furthermore, hydrogen remaining in the oxide 530 reacts with oxygen supplied to the oxide 530, so that the hydrogen can be removed as $H_2O$ (dehydration). This can inhibit recombination of hydrogen remaining in the oxide 530 with oxygen vacancies and formation of $V_OH$.

In addition, in the case where the insulator 524 includes an excess-oxygen region, it is preferable that the insulator 522 have a function of inhibiting diffusion of oxygen (e.g., an oxygen atom, an oxygen molecule, or the like) (or that the insulator 522 be less likely to transmit the oxygen).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

The insulator 522 is preferably a single layer or stacked layers using an insulator containing a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or ($Ba,Sr$)$TiO_3$ (BST). As miniaturization and high integration of transistors progress, a problem such as generation of leakage current may arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (i.e., an insulating material through which the oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the insulator.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 to have a stacked-layer structure that has thermal stability and a high dielectric constant.

Note that the transistor 500 in FIG. 6A and FIG. 6B includes the insulator 520, the insulator 522, and the insulator 524 as the second gate insulating film having a three-layer structure; however, the second gate insulating film may have a single-layer structure, a two-layer structure, or a stacked-layer structure of four or more layers. In that case, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one kind or a plurality of kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. In particular, the In-M-Zn oxide which can be used for the oxide 530 is preferably a CAAC-OS (C-Axls Aligned Crystal Oxide Semiconductor) or a CAC-OS (Cloud-Aligned Composite Oxide Semiconductor). Furthermore, as the oxide 530, an In—Ga oxide or an In—Zn oxide may be used. The CAAC-OS and the CAC-OS will be described later.

Furthermore, a metal oxide with a low carrier concentration is preferably used for the transistor 500. In the case where the carrier concentration of the metal oxide is reduced, the concentration of impurities in the metal oxide is reduced so that the density of defect states is reduced. In this specification and the like, a state with a low impurity concentration and a low density of defect states is referred to as a highly purified intrinsic or substantially highly purified intrinsic state. As examples of the impurities in the metal oxide, hydrogen, nitrogen, alkali metal, alkaline earth metal, iron, nickel, silicon, and the like are given.

In particular, hydrogen contained in a metal oxide reacts with oxygen bonded to a metal atom to be water, and thus forms oxygen vacancies in the metal oxide in some cases. In the case where hydrogen enters an oxygen vacancy in the oxide 530, the oxygen vacancy and the hydrogen are bonded to each other to form $V_OH$ in some cases. The $V_OH$ serves as a donor and an electron that is a carrier is generated in some cases. In other cases, bonding of part of hydrogen to oxygen bonded to a metal atom generates electrons serving as carriers. Thus, a transistor using a metal oxide containing much hydrogen is likely to have normally-on characteristics. Moreover, hydrogen in a metal oxide easily moves by stress such as heat and an electric field; thus, the reliability of a transistor may be low when the metal oxide contains plenty of hydrogen. In one embodiment of the present invention, $V_OH$ in the oxide 530 is preferably reduced as much as possible so that the oxide 530 becomes a highly purified intrinsic or substantially highly purified intrinsic oxide. It is important to remove impurities such as moisture and hydrogen in a metal oxide (sometimes described as dehydration or dehydrogenation treatment) and to compensate for oxygen vacancies by supplying oxygen to the metal oxide (sometimes described as oxygen supplying treatment) to obtain a metal oxide whose $V_OH$ is reduced enough. When a metal oxide in which impurities such as $V_OH$ are sufficiently reduced is used for a channel formation region of a transistor, stable electrical characteristics can be given.

A defect in which hydrogen has entered an oxygen vacancy can function as a donor of the metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Therefore, when a metal oxide is used as the oxide 530, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide in which impurities such as hydrogen are sufficiently reduced is used for a channel formation region of a transistor, stable electrical characteristics can be given.

When a metal oxide is used as the oxide 530, the carrier density of the metal oxide in the channel formation region is preferably lower than or equal to $1\times10^{18}$ cm$^{-3}$, further preferably lower than $1\times10^{17}$ cm$^{-3}$, further preferably lower than $1\times10^{16}$ cm$^{-3}$, further preferably lower than $1\times10^{13}$ cm$^{-3}$, further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

When a metal oxide is used for the oxide 530, contact between the conductor 542 (the conductor 542a and the conductor 542b) and the oxide 530 may make oxygen in the oxide 530 diffuse into the conductor 542, resulting in oxidation of the conductor 542. It is highly possible that oxidation of the conductor 542 lowers the conductivity of the conductor 542. Note that diffusion of oxygen in the oxide 530 into the conductor 542 can be interpreted as absorption of oxygen in the oxide 530 by the conductor 542.

When oxygen in the oxide 530 is diffused into the conductor 542 (the conductor 542a and the conductor 542b), a layer is sometimes formed between the conductor 542a and the oxide 530b and between the conductor 542b and the oxide 530b. The layer contains more oxygen than the conductor 542 does, and thus presumably has an insulating property. In this case, a three-layer structure of the conductor 542, the layer, and the oxide 530b can be regarded as a three-layer structure of a metal, an insulator, and a semiconductor and is sometimes referred to as a MIS (Metal-Insulator-Semiconductor) structure or a diode junction structure having an MIS structure as its main part.

Note that the layer is not limited to be formed between the conductor 542 and the oxide 530b. For example, the layer is formed between the conductor 542 and the oxide 530c in some cases. Alternatively, the layer is formed between the conductor 542 and the oxide 530b and between the conductor 542 and the oxide 530c in some cases.

The metal oxide functioning as the channel formation region in the oxide 530 has a band gap of preferably 2 eV or higher, further preferably 2.5 eV or higher. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, when the oxide 530 includes the oxide 530c over the oxide 530b, it is possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic proportion of the element M in constituent elements in the metal oxide used for the oxide 530a is preferably greater than the atomic proportion of the element M in constituent elements in the metal oxide used for the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. Moreover, a metal oxide that can be used as the oxide 530a or the oxide 530b can be used as the oxide 530c.

Specifically, as the oxide 530a, a metal oxide having In:Ga:Zn=1:3:4 [atomic ratio] or In:Ga:Zn=1:1:0.5 [atomic ratio] is used. As the oxide 530b, a metal oxide having In:Ga:Zn=4:2:3 [atomic ratio] or In:Ga:Zn=1:1:1 [atomic ratio] is used. As the oxide 530c, a metal oxide with In:Ga:Zn=1:3:4 [atomic ratio], Ga:Zn=2:1 [atomic ratio], or Ga:Zn=2:5 [atomic ratio] is used. Specific examples of the oxide 530c having a stacked-layer structure include a stacked-layer structure of In:Ga:Zn=4:2:3 [atomic ratio] and In:Ga:Zn=1:3:4 [atomic ratio], a stacked-layer structure of Ga:Zn=2:1 [atomic ratio] and In:Ga:Zn=4:2:3 [atomic ratio], a stacked-layer structure of Ga:Zn=2:5 [atomic ratio] and In:Ga:Zn=4:2:3 [atomic ratio], and a stacked-layer structure of gallium oxide and In:Ga:Zn=4:2:3 [atomic ratio].

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the densities of defect states in mixed layers formed at an interface between the oxide 530a and the oxide 530b and an interface between the oxide 530b and the oxide 530c is preferably made low.

Specifically, when the oxide 530a and the oxide 530b as well as the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

Note that semiconductor materials that can be used for the oxide 530 is not limited to the above metal oxides. A semiconductor material including a band gap (a semiconductor material that is not a zero-gap semiconductor) can be used for the oxide 530. For example, a single element semiconductor such as silicon, a compound semiconductor such as gallium arsenide, or a layered material (also referred to as an atomic layered material or a two-dimensional material) functioning as a semiconductor is preferably used as the semiconductor material. In particular, a layered material functioning as a semiconductor is preferably used as a semiconductor material.

Here, in this specification and the like, a layered material generally refers to a group of materials having a layered crystal structure. The layered crystal structure is a structure in which layers formed by covalent bonding or ionic bonding are stacked with bonding such as the Van der Waals force, which is weaker than covalent bonding or ionic bonding. The layered material has high electrical conductivity in a monolayer, that is, the two-dimensional electrical conductivity is high. When a material that functions as a semiconductor and has high two-dimensional electrical conductivity is used for a channel formation region, a transistor with a high on-state current can be provided.

Examples of the layered material include graphene, silicene, and chalcogenide. Chalcogenide is a compound containing chalcogen. Chalcogen is a general term of elements belonging to Group 16, which includes oxygen, sulfur, selenium, tellurium, polonium, and livermorium. Examples of chalcogenide include transition metal chalcogenide and chalcogenide of Group 13 elements.

As the oxide 530, a transition metal chalcogenide functioning as a semiconductor is preferably used, for example. Specific examples of the transition metal chalcogenide which can be used for the oxide 530 include molybdenum sulfide (typically $MoS_2$), molybdenum selenide (typically $MoSe_2$), molybdenum telluride (typically $MoTe_2$), tungsten sulfide ($WS_2$), tungsten selenide (typically $WSe_2$), tungsten telluride (typically $WTe_2$), hafnium sulfide ($HfS_2$), hafnium selenide ($HfSe_2$), zirconium sulfide ($ZrS_2$), zirconium selenide ($ZrSe_2$).

The conductor 542*a* and the conductor 542*b* functioning as the source electrode and the drain electrode are provided over the oxide 530*b*. For the conductor 542*a* and conductor 542*b*, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542*a* and the conductor 542*b* each having a single-layer structure are shown in FIG. 6, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

As illustrated in FIG. 6A, a region 543*a* and a region 543*b* are sometimes formed as low-resistance regions in the oxide 530 at and near the interface with the conductor 542*a* (the conductor 542*b*). In that case, the region 543*a* functions as one of a source region and a drain region, and the region 543*b* functions as the other of the source region and the drain region. Furthermore, the channel formation region is formed in a region between the region 543*a* and the region 543*b*.

When the conductor 542*a* (the conductor 542*b*) is provided to be in contact with the oxide 530, the oxygen concentration in the region 543*a* (the region 543*b*) sometimes decreases. In addition, a metal compound layer that contains the metal contained in the conductor 542*a* (the conductor 542*b*) and the component of the oxide 530 is sometimes formed in the region 543*a* (the region 543*b*). In such a case, the carrier concentration of the region 543*a* (the region 543*b*) increases, and the region 543*a* (the region 543*b*) becomes a low-resistance region.

The insulator 544 is provided to cover the conductor 542*a* and the conductor 542*b* and inhibits oxidation of the conductor 542*a* and the conductor 542*b*. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542*a* and the conductor 542*b* are oxidation-resistant materials or do not significantly lose their conductivity even after absorbing oxygen. Design is appropriately determined in consideration of required transistor characteristics.

When the insulator 544 is included, diffusion of impurities such as water and hydrogen contained in the insulator 580 into the oxide 530*b* through the oxide 530*c* and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with the inner side (the top surface and the side surface) of the metal oxide 530*c*. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator from which oxygen is released by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably lowered. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably has a function of inhibiting oxygen diffusion from the insulator 550 into the conductor 560. Providing the metal oxide having a function of inhibiting diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as generation of leakage current may arise because of a thinner gate insulating film. When the insulator functioning as the gate insulating film has a stacked-layer structure of a high-k material and a thermally stable material, a gate potential during operation of the transistor can be reduced while the physical thickness is maintained. Furthermore, the stacked-layer structure can be thermally stable and have a high dielectric constant.

Although the conductor 560 functioning as the first gate electrode has a two-layer structure in FIG. 6A and FIG. 6B, a single-layer structure or a stacked-layer structure of three or more layers may be employed.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, or the like), and a copper atom. Alternatively, the conductor 560a is preferably formed using a conductive material having a function of inhibiting diffusion of oxygen (e.g., at least one of oxygen atoms and oxygen molecules). When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting oxygen diffusion, tantalum, tantalum nitride, ruthenium, or ruthenium oxide is preferably used, for example. For the conductor 560a, the oxide semiconductor that can be used as the oxide 530 can be used. In that case, when the conductor 560b is deposited by a sputtering method, the conductor 560a can have a reduced electric resistance to be a conductor. Such a conductor can be referred to as an OC (Oxide Conductor) electrode.

In addition, a conductive material containing tungsten, copper, or aluminum as its main component is preferably used for the conductor 560b. Furthermore, the conductor 560b also functions as a wiring and thus a conductor having high conductivity is preferably used as the conductor 560b. For example, a conductive material containing tungsten, copper, or aluminum as its main component can be used. The conductor 560b may have a stacked-layer structure, for example, a stacked-layer structure of titanium or titanium nitride and any of the above conductive materials.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. In particular, silicon oxide and silicon oxynitride are preferable because they are thermally stable. In particular, silicon oxide and porous silicon oxide are preferable since an excess-oxygen region can be easily formed therein in a later step.

The insulator 580 preferably includes an excess-oxygen region. When the insulator 580 from which oxygen is released by heating is provided to include a region in contact with the oxide 530c, oxygen in the insulator 580 can be efficiently supplied to the oxide 530a and the oxide 530b through the oxide 530c. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions into the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water and hydrogen in the insulator 581 is preferably reduced.

Furthermore, a conductor 540a and a conductor 540b are positioned in openings formed in the insulator 581, the insulator 574, the insulator 580, and the insulator 544. The conductor 540a and the conductor 540b are provided to face each other with the conductor 560 therebetween. The structures of the conductor 540a and the conductor 540b are similar to a structure of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors in a change in electrical characteristics of the transistor. Accordingly, aluminum oxide can prevent mixing of impurities such as hydrogen and moisture into the transistor 500 in the fabrication process and after the fabrication of the transistor. In addition, release of oxygen from the oxide included in the transistor 500 can be inhibited. Therefore, aluminum oxide is suitably used for a protective film of the transistor 500.

In addition, an insulator 586 is provided over the insulator 582. For the insulator 586, a material similar to that for the insulator 320 can be used. Furthermore, when a material with a comparatively low dielectric constant is used for these insulators, parasitic capacitance generated between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 300. The conductor 546 and the conductor 548 can be provided using materials similar to those for the conductor 328 or the conductor 330.

Note that after the transistor 500 is formed, an opening may be formed to surround the transistor 500 and an insulator having a high barrier property against hydrogen or water may be formed to cover the opening. Surrounding the transistor 500 by the insulator having a high barrier property can prevent entry of moisture and hydrogen from the outside. Alternatively, a plurality of transistors 500 may be collectively surrounded by the insulator having a high barrier property against hydrogen or water. When an opening is formed to surround the transistor 500, for example, the formation of an opening reaching the insulator 514 or the insulator 522 and the formation of the insulator having a high barrier property in contact with the insulator 514 or the insulator 522 are suitable because these formation steps can also serve as some of the fabrication steps of the transistor 500. The insulator having a high barrier property against hydrogen or water is provided using a material similar to that for the insulator 522, for example.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, a conductive material such as an indium tin oxide, an indium oxide containing tungsten oxide, an indium zinc oxide containing tungsten oxide, an indium oxide containing titanium oxide, an indium tin oxide containing titanium oxide, an indium zinc oxide, or an indium tin oxide to which silicon oxide is added can be used.

The conductor 612 and the conductor 610 each have a single-layer structure in FIG. 4; however, the structure is not limited thereto, and a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. The insulator 640 can be provided using a material similar to that for the insulator 320. In addition, the insulator 640 may function as a planarization film that covers an uneven shape therebelow.

Using the structure, a semiconductor device using a transistor including an oxide semiconductor can be miniaturized or highly integrated.

Figure 7A:
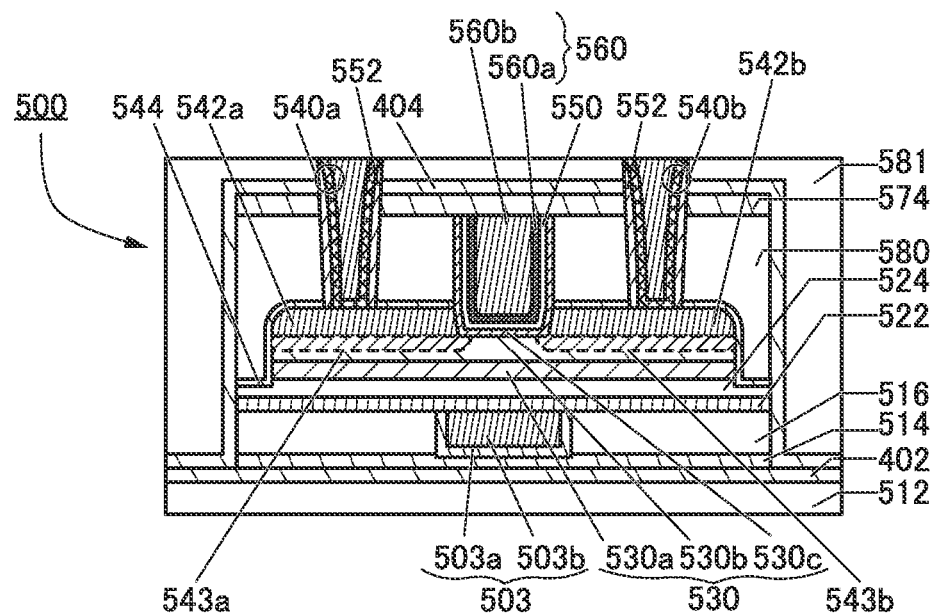
FIG. 7A and FIG. 7B are schematic cross-sectional views illustrating a structure example of a transistor.
Figure 7B:
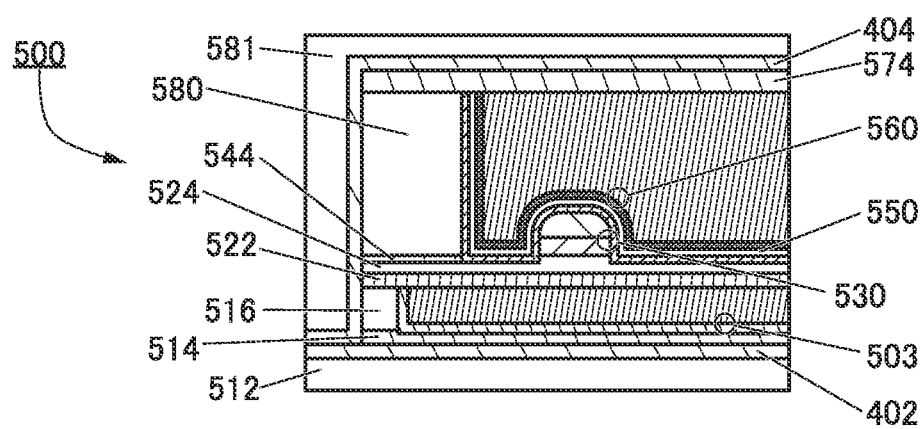

FIG. 7A and FIG. 7B illustrate a modification example of the transistor 500 illustrated in FIG. 6A and FIG. 6B. FIG. 6A is a cross-sectional view of the transistor 500 in the channel length direction, and FIG. 6B is a cross-sectional view of the transistor 500 in the channel width direction. Note that the structure illustrated in FIG. 7A and FIG. 7B can be employed for other transistors included in the semiconductor device of one embodiment of the present invention, such as the transistor 300.

FIG. 7A is a cross-sectional view of the transistor 500 in the channel length direction and FIG. 7B is a cross-sectional view of the transistor 500 in the channel width direction. The transistor 500 illustrated in FIG. 7A and FIG. 7B is different from the transistor 500 illustrated in FIG. 6A and FIG. 6B in that an insulator 402 and an insulator 404 are included. In addition, the transistor 500 illustrated in FIG. 7A and FIG. 7B is different from the transistor 500 illustrated in FIG. 6A and FIG. 6B in that an insulator 552 is provided in contact with the side surface of the conductor 540a and the insulator 552 is provided in contact with the side surface of the conductor 540b. Moreover, the transistor 500 illustrated in FIG. 7A and FIG. 7B is different from the transistor 500 illustrated in FIG. 6A and FIG. 6B in that the insulator 520 is not included.

In the transistor 500 illustrated in FIG. 7A and FIG. 7B, the insulator 402 is provided over the insulator 512. The insulator 404 is provided over the insulator 574 and the insulator 402.

In the transistor 500 illustrated in FIG. 7A and FIG. 7B, the insulator 514, the insulator 516, the insulator 522, the insulator 524, the insulator 544, the insulator 580, and the insulator 574 are patterned and covered with the insulator 404. That is, the insulator 404 is in contact with the top surfaces of the insulator 574, the side surface of the insulator 574, the side surface of the insulator 580, the side surface of the insulator 544, the side surface of the insulator 524, the side surface of the insulator 522, the side surface of the insulator 516, the side surface of the insulator 514, and the top surface of the insulator 402. Thus, the oxide 530 and the like are isolated from the outside by the insulator 404 and the insulator 402.

It is particularly preferable that the insulator 402 and the insulator 404 have higher capability of inhibiting diffusion of hydrogen (e.g., at least one of a hydrogen atom, a hydrogen molecule, and the like) or a water molecule. For example, for the insulator 402 and the insulator 404, silicon nitride or silicon nitride oxide with a high hydrogen barrier property is preferably used. This can inhibit the diffusion of hydrogen or the like into the oxide 530, whereby the degradation of the characteristics of the transistor 500 can be inhibited. Consequently, the reliability of the semiconductor device of one embodiment of the present invention can be increased.

The insulator 552 is provided in contact with the insulator 581, the insulator 404, the insulator 574, the insulator 580, and the insulator 544. The insulator 552 preferably has a function of inhibiting the diffusion of hydrogen or water molecules. For example, as the insulator 552, an insulator such as silicon nitride, aluminum oxide, or silicon nitride oxide that has a high hydrogen barrier property is preferably used. In particular, it is preferable to use silicon nitride is as the insulator 552 because of its high hydrogen barrier property. By using a material having a high hydrogen barrier property as the insulator 552, the diffusion of impurities such as water or hydrogen from the insulator 580 and the like into the oxide 530 through the conductor 540a and the conductor 540b can be inhibited. Furthermore, oxygen contained in the insulator 580 can be prevented from being absorbed by the conductor 540a and the conductor 540b. Consequently, the reliability of the semiconductor device of one embodiment of the present invention can be increased.

Figure 8:
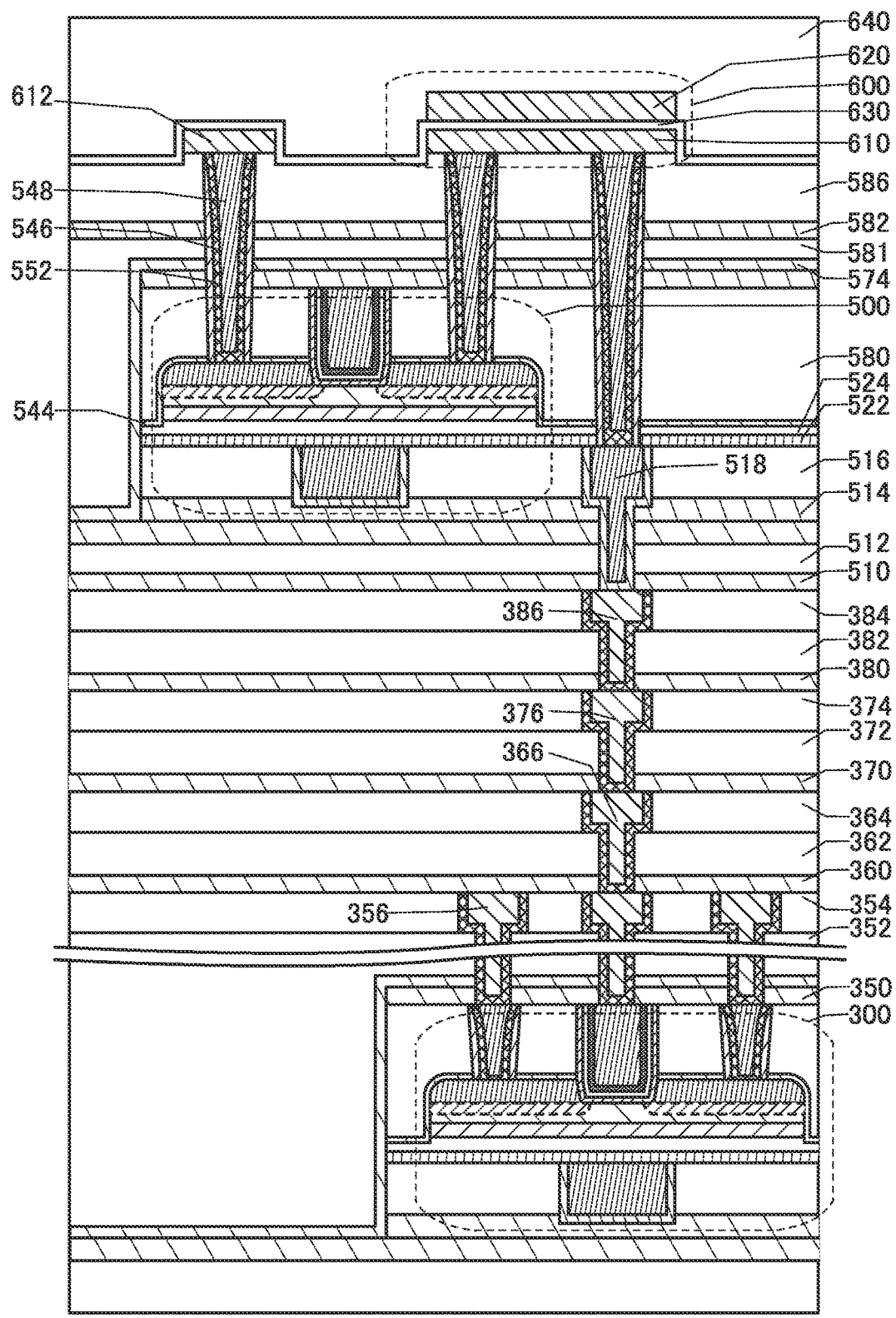
FIG. 8 is a schematic cross-sectional view illustrating a structure example of a semiconductor device.

FIG. 8 is a cross-sectional view illustrating a structure example of the semiconductor device in the case where the transistor 500 and the transistor 300 have the structure illustrated in FIG. 7A and FIG. 7B. The insulator 552 is provided on the side surface of the conductor 546.

Figure 9A:
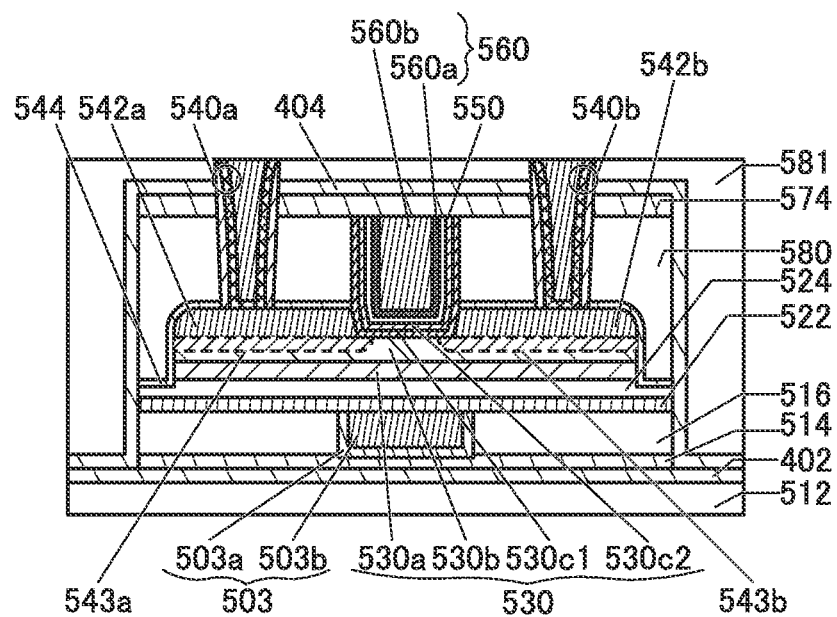
FIG. 9A and FIG. 9B are schematic cross-sectional views illustrating a structure example of a transistor.
Figure 9B:
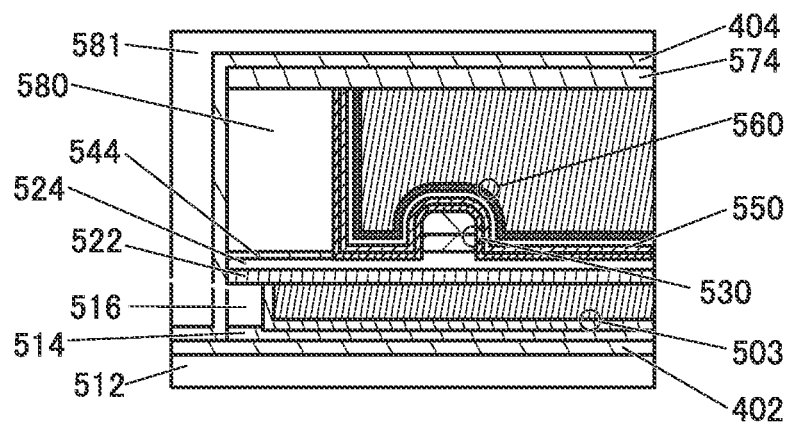

FIG. 9A and FIG. 9B illustrate a modification example of the transistor illustrated in FIG. 7A and FIG. 7B. FIG. 9A is a cross-sectional view of the transistor in the channel length direction and FIG. 9B is a cross-sectional view of the transistor in the channel width direction. The transistor illustrated in FIG. 9A and FIG. 9B is different from the transistor illustrated in FIG. 7A and FIG. 7B in that the oxide 530c has a two-layer structure of an oxide 530c1 and an oxide 530c2.

The oxide 530c1 is in contact with the top surface of the insulator 524, the side surface of the oxide 530a, the top surface and the side surface of the oxide 530b, the side surfaces of the conductor 542a and the conductor 542b, the side surface of the insulator 544, and the side surface of the insulator 580. The oxide 530c2 is in contact with the insulator 550.

An In—Zn oxide can be used as the oxide 530c1, for example. For the oxide 530c2, a material equivalent to a material that can be used for the oxide 530c when the oxide 530c has a single-layer structure can be used. For example, as the oxide 530c2, a metal oxide with In:Ga:Zn=1:3:4 [atomic ratio], Ga:Zn=2:1 [atomic ratio], or Ga:Zn=2:5 [atomic ratio] can be used.

When the oxide 530c has a two-layer structure of the oxide 530c1 and the oxide 530c2, the on-state current of the transistor can be increased as compared with the case where the oxide 530c has a single-layer structure. Thus, the transistor can be a power MOS transistor, for example. Note that the oxide 530c included in the transistor illustrated in FIG. 6A and FIG. 6B can also have a two-layer structure of the oxide 530c1 and the oxide 530c2.

The transistor illustrated in FIG. 9A and FIG. 9B can be employed for the transistor 300, for example. As described above, the transistor 300 can be employed for the transistor M1 shown in FIG. 3 in the above embodiment. Thus, the on-state current of the transistor M1 having a function of an output transistor can be increased, whereby the accuracy of the potential output from the semiconductor device of one embodiment of the present invention can be increased. Note that the structure illustrated in FIG. 9A and FIG. 9B can also be employed for a transistor other than the transistor 300 included in the semiconductor device of one embodiment of the present invention, such as the transistor 500.

Figure 10:
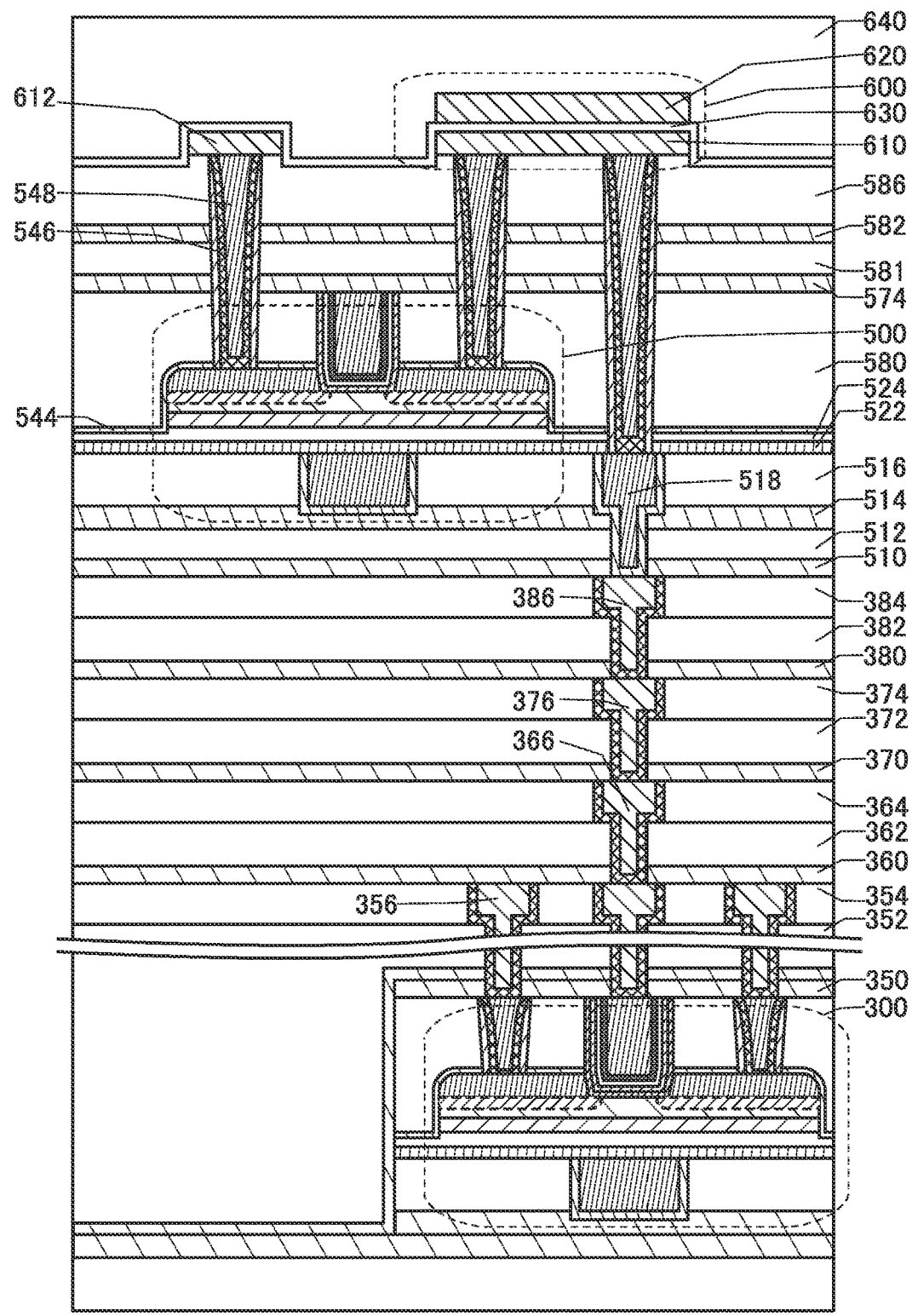
FIG. 10 is a schematic cross-sectional view illustrating a structure example of a semiconductor device.

FIG. 10 is a cross-sectional view illustrating a structure example of the semiconductor device when the transistor 500 has the structure illustrated in FIG. 6A and FIG. 6B and the transistor 300 has the structure illustrated in FIG. 9A and FIG. 9B. Note that a structure is employed where the insulator 552 is provided on the side surface of the conductor 546 as in FIG. 8. As illustrated in FIG. 10, in the semiconductor device of one embodiment of the present invention, both the transistor 300 and the transistor 500 can be OS transistors while having different structures from each other.

This embodiment can be implemented in an appropriate combination with the structures described in the other embodiments and the like.

Embodiment 5

Figure 12A:
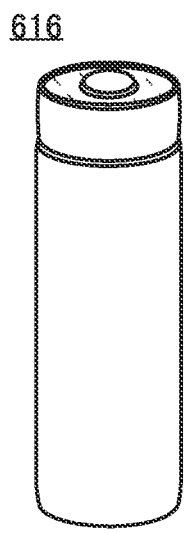
FIG. 12A and FIG. 12B are perspective views illustrating an example of a secondary battery.
Figure 12B:
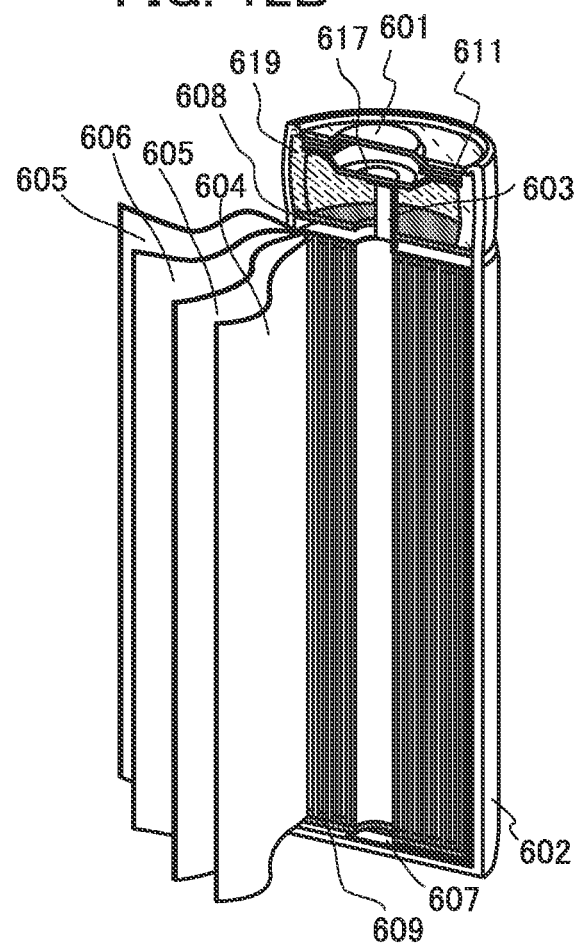

An example of a cylindrical secondary battery is described with reference to FIG. 12A and FIG. 12B. A cylindrical secondary battery 616 includes, as illustrated in FIG. 12B, a positive electrode cap (battery lid) 601 on the top surface and a battery can (outer can) 602 on the side and bottom surfaces. The positive electrode cap and the battery can (outer can) 602 are insulated by a gasket (insulating packing) 619.

FIG. 12B illustrates a schematic cross-sectional view of the cylindrical secondary battery. Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound around a center pin. One end of the battery can 602 is closed and the other end thereof is opened. For the battery can 602, a metal having corrosion resistance to an electrolyte solution, such as nickel, aluminum, or titanium, an alloy of such a metal, or an alloy of such a metal and another metal (e.g., stainless steel or the like) can be used. The battery can 602 is preferably covered with nickel, aluminum, or the like to prevent corrosion due to an electrolyte solution. Inside the battery can 602, the battery element in which the positive electrode, the negative electrode, and the separator are wound is interposed between a pair of insulating plates 608 and 609 that face each other. Furthermore, a nonaqueous electrolyte solution (not illustrated) is injected inside the battery can 602 provided with the battery element. The secondary battery is composed of a positive electrode containing an active material such as lithium cobalt oxide (LiCoO$_2$) or lithium iron phosphate (LiFePO$_4$), a negative electrode composed of a carbon material such as graphite capable of occluding and releasing lithium ions, a nonaqueous electrolytic solution in which an electrolyte composed of a lithium salt such as LiBF$_4$ or LiPF$_6$ is dissolved in an organic solvent such as ethylene carbonate or diethyl carbonate, and the like.

Since the positive electrode and the negative electrode of the cylindrical storage battery are wound, active materials are preferably formed on both sides of current collectors. A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 617 and the bottom of the battery can 602, respectively. The safety valve mechanism 617 is electrically connected to the positive electrode cap 601 through a PTC (Positive Temperature Coefficient) element 611. The safety valve mechanism 617 cuts off the electrical connection between the positive electrode cap 601 and the positive electrode 604 when the increased internal pressure of the battery exceeds a predetermined threshold value. In addition, the PTC element 611 is a thermally sensitive resistor whose resistance increases in the case where temperature rises, and limits the amount of current by increasing the resistance to prevent abnormal heat generation. Barium titanate (BaTiO$_3$)-based semiconductor ceramic or the like can be used for the PTC element.

A lithium-ion secondary battery using an electrolyte solution includes a positive electrode, a negative electrode, a separator, an electrolyte solution, and an exterior body. Note that in a lithium-ion secondary battery, the anode and the cathode are interchanged in charging and discharging, and the oxidation reaction and the reduction reaction are interchanged; thus, an electrode with a high reaction potential is called the positive electrode and an electrode with a low reaction potential is called the negative electrode. For this reason, in this specification, the positive electrode is referred to as a "positive electrode" or a "+ electrode (plus electrode)" and the negative electrode is referred to as a "negative electrode" or a "− electrode (minus electrode)" in any of the case where charging is performed, the case where discharging is performed, the case where a reverse pulse current is made to flow, and the case where charging current is made to flow. The use of terms such as anode (positive electrode) and cathode (negative electrode) related to oxidation reaction and reduction reaction might cause confusion because the anode and the cathode are reversed in charging and in discharging. Thus, the terms anode and cathode are not used in this specification. If the term anode or cathode is used, whether it is at the time of charging or discharging is noted and whether it corresponds to a positive electrode or a negative electrode is also noted.

Figure 12C:
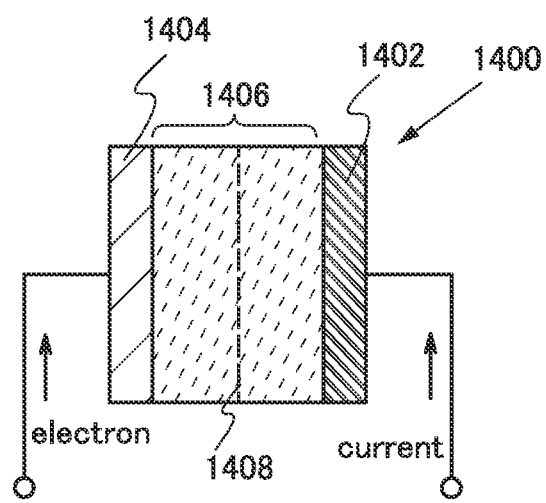
FIG. 12C is a model diagram of a secondary battery at the time of charging.

A charger is connected to two terminals shown in FIG. 12C to charge a storage battery 1400. As the charging of the storage battery 1400 proceeds, a potential difference between electrodes increases. The positive direction in FIG. 12C is the direction in which a current flows from a terminal outside the storage battery 1400 to a positive electrode 1402; from the positive electrode 1402 to a negative electrode 1404 in the storage battery 1400; and from the negative electrode to a terminal outside the storage battery 1400. In other words, the direction in which a charge current flows is regarded as the direction of a current.

In this embodiment, an example of a lithium-ion secondary battery is shown; however, it is not limited to a lithium-ion secondary battery and a material including an element A, an element X, and oxygen can be used as a positive electrode material for the secondary battery. The element A is preferably one or more selected from the Group 1 elements and the Group 2 elements. As a Group 1 element, for example, an alkali metal such as lithium, sodium, or potassium can be used. As a Group 2 element, for example, calcium, beryllium, magnesium, or the like can be used. As the element X, for example, one or more selected from metal elements, silicon, and phosphorus can be used. The element X is preferably one or more selected from cobalt, nickel, manganese, iron, and vanadium. Typical examples include lithium-cobalt composite oxide (LiCoO$_2$) and lithium iron phosphate (LiFePO$_4$).

The negative electrode includes a negative electrode active material layer and a negative electrode current collector. In addition, the negative electrode active material layer may contain a conductive additive and a binder.

For the negative electrode active material, an element that enables charge-discharge reaction by alloying and dealloying reactions with lithium can be used. For example, a material containing at least one of silicon, tin, gallium, aluminum, germanium, lead, antimony, bismuth, silver, zinc, cadmium, indium, and the like can be used. Such elements have higher capacity than carbon, and silicon in particular has a high theoretical capacity of 4200 mAh/g.

In addition, the secondary battery preferably includes a separator. As the separator, for example, a fiber containing cellulose such as paper; nonwoven fabric; a glass fiber; ceramics; a synthetic fiber using nylon (polyamide), vinylon (polyvinyl alcohol-based fiber), polyester, acrylic, polyolefin, or polyurethane; or the like can be used.

Figure 11A:
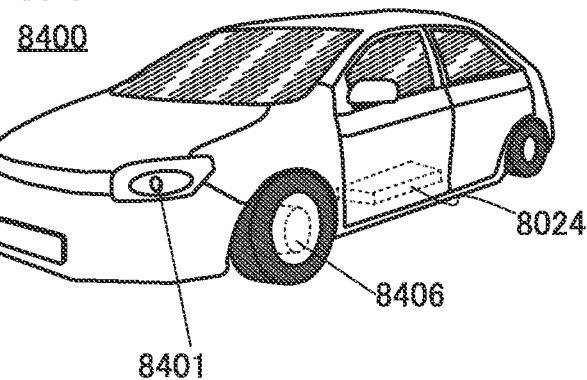
FIG. 11A, FIG. 11B, and FIG. 11C illustrate examples of moving objects.

FIG. 11 illustrates examples of vehicles each using the overdischarge reduction system of a secondary battery of one embodiment of the present invention. A secondary battery module 8024 of a vehicle 8400 illustrated in FIG. 11A not only drives an electric motor 8406 but also can supply electric power to a light-emitting device such as a headlight 8401 or a room light (not illustrated). For the secondary battery module 8024 of the vehicle 8400, a plurality of the cylindrical secondary batteries 616 illustrated in FIG. 12B that are interposed between a first conductive plate and a second conductive plate to form a battery pack may be used.

The plurality of secondary batteries 616 may be connected in parallel, connected in series, or connected in series after being connected in parallel. By forming a secondary battery module 8024 including the plurality of secondary batteries 616, large electric power can be extracted. The overdischarge prevention circuit illustrated in Embodiment 1 or Embodiment 2 may be provided for each of the plurality of secondary batteries 616, or one overdischarge prevention circuit may be provided for the plurality of secondary batteries 616.

In order to cut off electric power from the plurality of secondary batteries, the secondary batteries in the vehicle include a service plug or a circuit breaker which can cut off a high voltage without the use of equipment. For example, in the case where 48 battery modules which each include two to ten cells are connected in series, a service plug or a circuit breaker is placed between the 24th battery pack and the 25th battery pack.

Figure 11B:
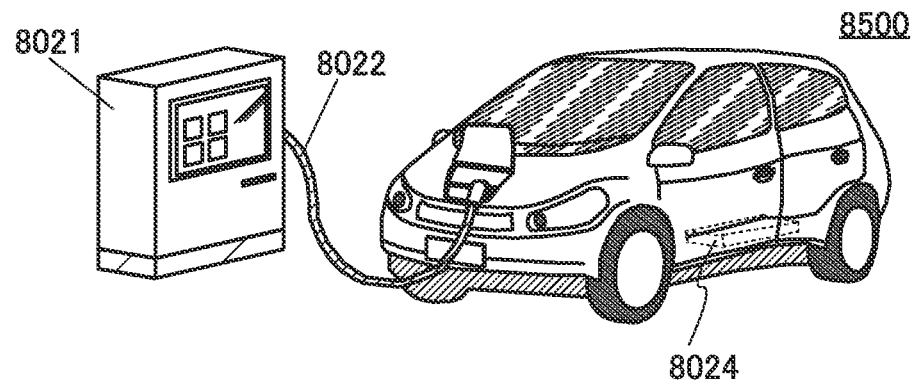

A vehicle 8500 illustrated in FIG. 11B can be charged when a secondary battery included in the vehicle 8500 is supplied with electric power from external charging equipment by a plug-in system, a contactless power feeding system, or the like. FIG. 11B illustrates a state in which the secondary battery module 8024 incorporated in the vehicle 8500 is charged with a ground-based charging apparatus 8021 through a cable 8022. Charging may be performed as appropriate by a given method such as CHAdeMO (registered trademark) or Combined Charging System as a charging method, the standard of a connector, or the like. The charging apparatus 8021 may be a charging station provided in a commercial facility or a power source in a house. For example, with a plug-in technique, the secondary battery module 8024 incorporated in the vehicle 8500 can be charged by power supply from the outside. Charging can be performed by converting AC power into DC power through a converter such as an ACDC converter.

Furthermore, although not illustrated, a power-receiving device can be incorporated in the vehicle, and the vehicle can be charged by being supplied with electric power from an above-ground power transmitting device in a contactless manner. In the case of this contactless power feeding system, by incorporating a power-transmitting device in a road or an exterior wall, charging is not limited to while the vehicle is stopped but also can be performed while the vehicle is running. In addition, this contactless power feeding system may be utilized to transmit and receive electric power between vehicles. Furthermore, a solar cell may be provided in the exterior of the vehicle to charge the secondary battery while the vehicle is stopped or while the vehicle is running. For supply of electric power in such a contactless manner, an electromagnetic induction method or a magnetic resonance method can be used.

Figure 11C:
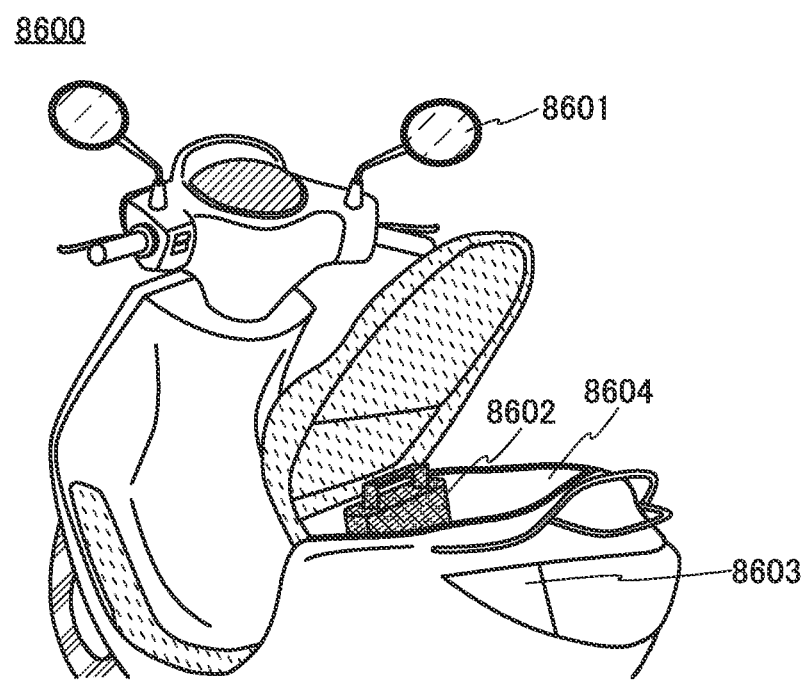

FIG. 11C is an example of a motorcycle using the secondary battery of one embodiment of the present invention. A scooter 8600 illustrated in FIG. 11C includes a secondary battery 8602, side mirrors 8601, and direction indicators 8603. The secondary battery 8602 can supply electricity to the direction indicators 8603.

Furthermore, in the scooter 8600 illustrated in FIG. 11C, the secondary battery 8602 can be stored in an under-seat storage 8604. The secondary battery 8602 can be stored in the under-seat storage 8604 even when the under-seat storage 8604 is small. Furthermore, this embodiment can also be applied to a power source of a snowmobile or a personal watercraft as well as a scooter.

This embodiment can be combined with any of the other embodiments as appropriate.

Embodiment 6

Figure 13:
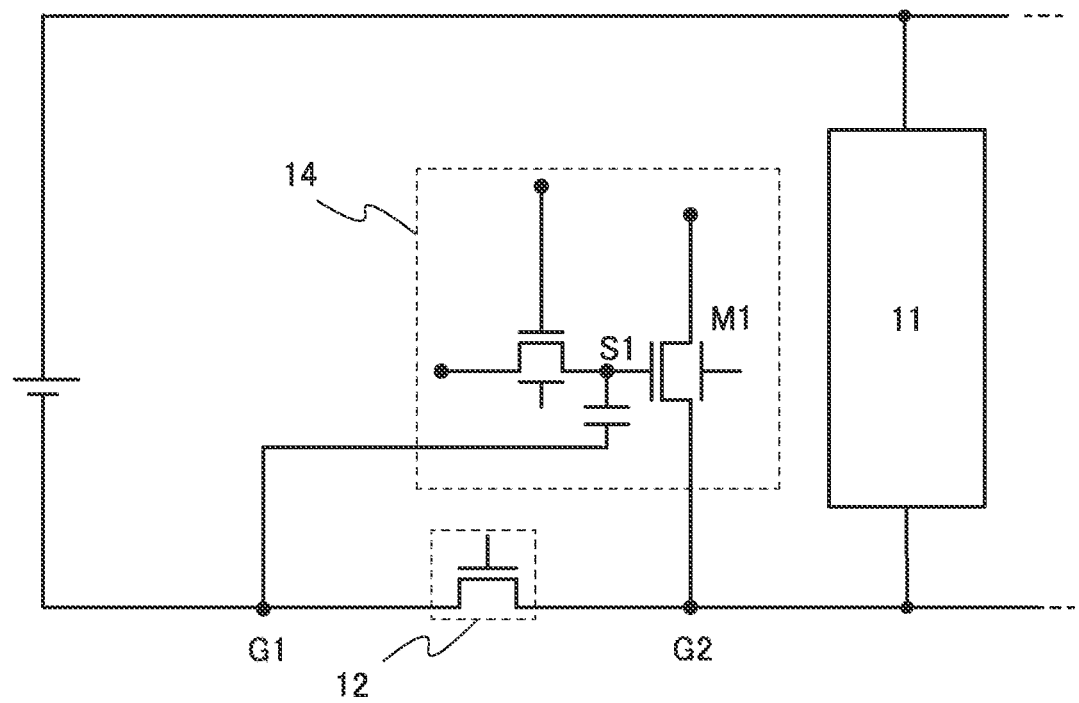
FIG. 13 is an example of a circuit diagram of one embodiment of the present invention.

FIG. 13 shows a circuit diagram for describing a different example of an operation for a measure against off-state leakage current from Embodiment 1.

A protection circuit 14 is connected to G2 on the low potential side. The disconnecting switch 12 is provided between G1 on the low potential side and G2 on the low potential side. A gate S1 of the transistor M1 electrically connected to G2 is connected to a capacitor, and one of the terminals of the capacitor is connected to G1. The disconnecting switch 12 can be formed using an OS transistor, in which case the leakage current of the load can be reduced.

When the secondary battery enters an overdischarged state by the decrease in the supply voltage of the secondary battery due to the power consumption caused by the use of the secondary battery, an overdischarge is detected and G1 and G2 are disconnected from each other by the disconnecting switch 12. Meanwhile, the potential of G2 increases to a potential that is the same as that of the secondary battery on the high potential side (VDD) at a maximum.

The potential of the gate S1 is lowered relative to G2 with an increased potential, whereby the transistor M1 is automatically turned off. The transistor M1 functions as a power switch that controls the power supply for G2 on the low potential side of the charging control circuit 11; therefore, the power supply to the charging detection circuit is blocked when the transistor M1 is turned off.

When the charging of the secondary battery is started, a low potential of the charging control circuit 11 is supplied and the potential of G2 is decreased again (Vgs of the transistor M1 is increased), whereby the transistor M1 is turned on and the system can automatically recover from an off-state, that is, the system can automatically turn on.

Note that an example where each of the transistors in FIG. 13 is a transistor including a back gate is shown; however, the structure thereof is not particularly limited thereto and a transistor not including a back gate may be used.

After an overdischarge is detected, the protection circuit 14 for protecting the secondary battery also needs to enter a state close to a complete off state. When the protection circuit 14 has the structure shown in FIG. 13, the protection circuit 14 can automatically turn off, whereby the off-leakage current in the entire system in an overdischarged state can be reduced. In this structure, the system can not only automatically turn off but can also automatically recover from an off-state, that is, the system can automatically turn on.

This embodiment can be freely combined with any of the other embodiments.

REFERENCE NUMERALS

12: disconnecting switch, 13: charging detection circuit, 14: protection circuit, 15: circuit, 300: transistor, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 402: insulator, 404: insulator, 410: memory element, 420: memory element, 430: memory element, 440: memory element, 450: memory element, 460: memory element, 470: memory element, 500: transistor, 503: conductor, 503a: conductor, 503b: conductor, 510: insulator, 512: insulator, 514: insulator, 516: insulator, 518: conductor, 520: insulator, 522: insulator, 524: insulator, 530: oxide, 530a: oxide, 530b: oxide, 530c: oxide, 530c1: oxide, 530c2: oxide, 540a: conductor, 540b: conductor, 542: conductor, 542a: conductor, 542b: conductor, 543a: region, 543b: region, 544: insulator, 546: conductor, 548: conductor, 550: insulator, 552: insulator, 560: conductor, 560a: conductor, 560b: conductor, 574: insulator, 580: insulator, 581: insulator, 582: insulator, 586: insulator, 600:

capacitor, 601: positive electrode cap, 602: battery can, 603: positive electrode terminal, 604: positive electrode, 605: separator, 606: negative electrode, 607: negative electrode terminal, 608: insulating plate, 609: insulating plate, 610: conductor, 611: PTC element, 612: conductor, 616: secondary battery, 617: safety valve mechanism, 619: gasket, 620: conductor, 630: insulator, 640: insulator, 1400: storage battery, 1402: positive electrode, 1404: negative electrode, 8021: charging device, 8022: cable, 8024: secondary battery module, 8400: vehicle, 8401: headlight, 8406: electric motor, 8500: vehicle, 8600: scooter, 8601: side mirror, 8602: secondary battery, 8603: direction indicator, 8604: under-seat storage

The invention claimed is:

1. An overdischarge prevention circuit of a secondary battery, comprising:
   a charging control circuit electrically connected to the secondary battery;
   a disconnecting transistor between the secondary battery and the charging control circuit;
   a first transistor whose source is electrically connected to a wiring connecting the secondary battery and the disconnecting transistor;
   a second transistor connected to a wiring connecting the disconnecting transistor and the charging control circuit; and
   a third transistor whose drain or source is connected to a gate of the second transistor.

2. The overdischarge prevention circuit according to claim 1, further comprising an inverter,
   wherein an input of the inverter is connected to a drain of the second transistor, and
   wherein an output of the inverter is connected to a gate of the first transistor.

3. The overdischarge prevention circuit according to claim 2, wherein charging detection is performed using the second transistor, the third transistor, and the inverter.

4. The overdischarge prevention circuit according to claim 1, wherein a charging detection circuit included in the overdischarge prevention circuit disconnects electrical connection between the first transistor and the second transistor by driving the disconnecting transistor.

5. The overdischarge prevention circuit according to claim 1, wherein a semiconductor layer of the first transistor is an oxide semiconductor layer.

6. An electronic device comprising the overdischarge prevention circuit according to claim 1.

7. A secondary battery module comprising:
   a secondary battery and a charging control circuit electrically connected to the secondary battery;
   a disconnecting transistor between the secondary battery and the charging control circuit;
   a first transistor whose source is electrically connected to a wiring connecting the secondary battery and the disconnecting transistor;
   a second transistor connected to a wiring connecting the disconnecting transistor and the charging control circuit; and
   a third transistor whose drain or source is connected to a gate of the second transistor.

\* \* \* \* \*